(12) United States Patent
Ott et al.

(10) Patent No.: US 12,551,449 B2
(45) Date of Patent: Feb. 17, 2026

(54) TUNABLE DEGRADATION IN HYDROGEL MICROPARTICLES

(71) Applicant: LIKARDA, INC., Kansas City, MO (US)

(72) Inventors: Lindsey Ott, Kansas City, MO (US); Stephen Harrington, Kansas City, MO (US); Karthik Ramachandran, Kansas City, MO (US); Lisa Stehno-Bittel, Kansas City, MO (US); Megan E. Hamilton, Kansas City, MO (US)

(73) Assignee: LIKARDA, INC., Kansas City, MO (US)

( * ) Notice: Subject to any disclaimer, the term of this patent is extended or adjusted under 35 U.S.C. 154(b) by 1107 days.

(21) Appl. No.: 17/617,086

(22) PCT Filed: Jun. 5, 2020

(86) PCT No.: PCT/US2020/036361
§ 371 (c)(1),
(2) Date: Dec. 7, 2021

(87) PCT Pub. No.: WO2020/247776
PCT Pub. Date: Dec. 10, 2020

(65) Prior Publication Data
US 2022/0233454 A1 Jul. 28, 2022

Related U.S. Application Data

(60) Provisional application No. 62/858,578, filed on Jun. 7, 2019.

(51) Int. Cl.
| | |
|---|---|
| *A61K 9/50* | (2006.01) |
| *A61K 9/00* | (2006.01) |
| *A61L 27/18* | (2006.01) |
| *A61L 27/38* | (2006.01) |
| *A61L 27/52* | (2006.01) |
| *A61L 27/54* | (2006.01) |
| *A61P 19/02* | (2006.01) |

(52) U.S. Cl.
CPC .......... *A61K 9/5026* (2013.01); *A61K 9/0024* (2013.01); *A61L 27/18* (2013.01); *A61L 27/38* (2013.01); *A61L 27/52* (2013.01); *A61L 27/54* (2013.01); *A61P 19/02* (2018.01)

(58) Field of Classification Search
None
See application file for complete search history.

(56) References Cited

U.S. PATENT DOCUMENTS

| | | |
|---|---|---|
| 7,276,251 B2 | 10/2007 | Kim et al. |
| 8,679,809 B2 | 3/2014 | Chan et al. |
| 9,974,886 B2 | 5/2018 | Wang et al. |
| 2008/0193536 A1* | 8/2008 | Khademhosseini ........................ A61K 35/545 424/484 |
| 2010/0069781 A1 | 3/2010 | Johansen et al. |
| 2011/0256089 A1 | 10/2011 | Lim et al. |
| 2012/0156259 A1 | 6/2012 | Rau et al. |
| 2015/0071997 A1 | 3/2015 | Garcia et al. |
| 2015/0217024 A1* | 8/2015 | Wang ..................... A61L 27/56 435/262 |
| 2015/0352056 A1 | 12/2015 | Ramachandran et al. |
| 2016/0297131 A1 | 10/2016 | Kameoka et al. |
| 2018/0049977 A1 | 2/2018 | Elbert et al. |
| 2022/0175666 A1 | 6/2022 | Lee et al. |

FOREIGN PATENT DOCUMENTS

| | | |
|---|---|---|
| CA | 2949716 | 12/2015 |
| CN | 106470666 | 3/2017 |
| WO | 2002030481 | 4/2002 |
| WO | 2012148684 | 11/2012 |
| WO | 2015187098 | 12/2015 |
| WO | 2020082134 | 4/2020 |
| WO | 2020190094 | 9/2020 |
| WO | 2022165416 | 8/2022 |

OTHER PUBLICATIONS

Supplementary Search Report in corresponding European Patent Application Serial No. 20817813.7, dated Jun. 29, 2023.
Examination Report in corresponding Indian Patent Application Serial No. 202147054992, dated Feb. 21, 2024 (English translation attached).
Office Action in corresponding Chinese Patent Application Serial No. 202080041898.0, dated Jul. 29, 2024 (English translation attached).
Office Action in corresponding European Patent Application Serial No. 20817813.7, dated May 8, 2024.
Office Action in corresponding Japanese Patent Application Serial No. 2021-571880, dated May 31, 2024 (English translation attached).
Office Action in co-pending Canadian Patent Application Serial No. 3,134,372, dated Nov. 10, 2023.
International Search Report and Written Opinion in corresponding PCT/US2020/036361, dated Sep. 9, 2020.
Shimojo, et al., "The crosslinking degree controls the mechanical, rheological, and swelling properties of hyaluronic acid microparticles", J Biomedical Mat Res., 2014, 7 pages.
Wong, et al., "Injectable cell-encapsulating composite alginate-collagen platform with inducible termination switch for safer ocular drug delivery", Biomaterials, 2019, 201, pp. 53-67.

(Continued)

*Primary Examiner* — Celeste A Roney
(74) *Attorney, Agent, or Firm* — Hovey Williams LLP; Crissa A. Cook

(57) ABSTRACT

Non-alginate hydrogel microparticles for localized delivery and sustained release of therapeutic cells and/or tissues (including homogenous or heterogenous cell clusters) at a site of implantation. The microparticles comprise a 3-dimensional matrix of covalently crosslinked non-alginate polymer compounds and a therapeutically-effective amount of cells and/or tissue entrapped therein, wherein the cells have a viability of at least about 50%, and wherein the microparticle has a size of greater than about 30 μm. Compositions containing such microparticles and methods of using such microparticles for treatment are also described.

19 Claims, 21 Drawing Sheets

(56) References Cited

OTHER PUBLICATIONS

Wang, et al., "B12-dependent photoresponsive protein hydrogels for controlled stem cell/protein release", PNAS, 2017, 114(23), pp. 5912-5917.

Ho, et al., "A hyaluronan/methylcellulose-based hydrogel for local cell and biomolecule delivery to the central nervous system", Brain Research Bulletin, 2019, 148, pp. 46-54.

Weiden, et al., "Injectable Biomimetic Hydrogels as Tools for Efficient T Cell Expansion and Delivery", Frontiers in Immunology, 2018, 9(2798), 15 pages.

Seeto, et al., "Encapsulation of Equine Endothelial Colony Forming Cells in Highly Uniform, Injectable Hydrogel Microspheres for Local Cell Delivery", Tissue Eng: Part C, 2017, 23(11), pp. 815-825.

Office Action in corresponding Chinese Patent Application Serial No. 202080041898.0, dated Jul. 27, 2023 (English machine translation attached).

Examination Report in co-pending Australian Patent Application Serial No. 2020288650, dated Mar. 20, 2025.

Office Action in co-pending Chinese Patent Application Serial No. 202080041898.0, dated Mar. 27, 2025 (English machine translation attached).

Notice of Deficiencies in co-pending Israeli Patent Application Serial No. 295911, dated Jun. 16, 2025.

Notice of Allowance in co-pending Chinese Patent Application Serial No. 202080041898.0, dated Jun. 2, 2025 (English machine translation attached).

Notice of Allowance in co-pending Japanese Patent Application Serial No. 2021-571880, dated Jan. 7, 2020 (English machine translation attached).

\* cited by examiner

TUNABLE DEGRADATION IN HYDROGEL MICROPARTICLES

CROSS-REFERENCE TO RELATED APPLICATIONS

The present application is the U.S. National Stage of International Patent Application No. PCT/US2020/036361, filed Jun. 5, 2020, which claims the priority benefit of U.S. Provisional Patent Application Ser. No. 62/858,578, filed Jun. 7, 2019, entitled TUNABLE DEGRADATION IN HYDROGEL MICROPARTICLES, each of which is incorporated by reference in its entirety herein.

BACKGROUND

Field of the Invention

The present invention relates to hydrogel-based microparticles for encapsulating biologics, and methods for modulating the physical and chemical characteristics of the hydrogel matrix, for example, to increase or decrease degradation profiles for the microparticles.

Description of Related Art

Cell microencapsulation is a rapidly expanding field with broad potential utility in the treatment of diseases such as diabetes, cancer, heart disease and immune disorders, along with tissue engineering research and regenerative medicine. Traditional alginate microspheres still suffer from poor biocompatibility, and microencapsulation using more advanced hydrogels is challenging due to their slower gelation rates. What is needed are non-cytotoxic, non-emulsion-based hydrogel microparticles that can be fabricated from a wide variety of hydrogel materials.

SUMMARY OF THE INVENTION

Described herein are non-alginate hydrogel microparticles for localized delivery and sustained release of therapeutic cells and/or tissues (including homogenous or heterogenous cell clusters) at a site of implantation. The microparticles comprise a 3-dimensional matrix of covalently crosslinked non-alginate polymer compounds and a therapeutically-effective amount of cells and/or tissue entrapped therein, wherein the cells have a viability of at least 50%, and wherein the microparticle has a size of greater than about 30 µm. Exemplary polymer compounds are selected from slow-gelling polymer precursors selected from the group consisting of branched or unbranched hyaluronic acid, branched or unbranched functionalized hyaluronic acid, branched or unbranched functionalized polyethylene glycol, hyaluronan, fibrin, chitosan, collagen, polylactic acid, poly(L-lactic acid), polylactic-co-glycolic acid, polycaprolactone, polyvinyl alcohol, and combinations thereof. The matrix can further comprise crosslinking agents crosslinked with the non-alginate polymer compounds, selected from the group consisting of dithiothreitol, branched or unbranched functionalized polyethylene glycol, dithiols, ethylene glycol bis-mercaptoacetate, and combinations thereof. Exemplary functionalized polyethylene glycols include, without limitation, polyethylene glycol dithiol, polyethylene glycol diacrylate, polyethylene glycol divinyl sulfone, polyethylene glycol dimaleimide, and combinations thereof.

The matrix could be homogenous comprising one type of covalently crosslinked polymer backbone (with or without an additional crosslinker of a different polymer type). The matrix could also be heterogenous comprising a mixture of two or more polymer precursors, such as a combination of high ($\geq 500$ kDA, preferably $\geq 100$ kDA) and low ($<100$ kDA, preferably $\leq 50$ kDa) molecular weight polymer precursors, and/or a mixture of two or more crosslinking agents.

Compositions comprising a plurality of such microparticles are also described herein. Such compositions can also include a plurality of "empty" microparticles dispersed along with the cell- or tissue-loaded microparticles. The compositions could include a mixture of different microparticles, for example, a mixture of degradable and durable hydrogel microparticles, and/or a mixture of different sized microparticles (e.g., a plurality of larger microparticles and a plurality of smaller microparticles), and/or a mixture of microparticles each containing different types of cells and/or tissues (e.g., insulin producing cells in one set of microparticles and supportive stem cells in another set of microparticles). Two different compositions could also be combined or co-administered instead of mixing the two different types of particles into a single composition.

Also contemplated herein are various methods for localized delivery and sustained release of therapeutic cells and/or tissues at a site of implantation by administering the microparticles and/or compositions containing such microparticles (alone or in combination with other types of therapeutic compounds if desired). Typically, the microparticles or compositions are directly injected or implanted at or near (adjacent) the site for treatment.

Also described herein are various methods and techniques for adjusting the degradation rate of the microparticles by changing various parameters of the microparticle, including in the formulation and/or the processing parameters, such as polymer precursor mass fraction or molecular weight, crosslinker molecular weight, ratio of crosslinker and polymer precursor, crosslinker hydrolysis, crosslinking kinetics, crosslinking time, e.g., UV exposure time, and combinations thereof.

Further, embodiments described herein contemplate use of empty microparticles for joint lubrication and/or viscosupplementation by implanting a plurality of empty microparticles in a joint.

BRIEF DESCRIPTION OF THE DRAWINGS

Figure (FIG. 1 is an illustration of examples of covalent crosslinking of the hydrogel precursor compounds.

DETAILED DESCRIPTION

Figure 1:
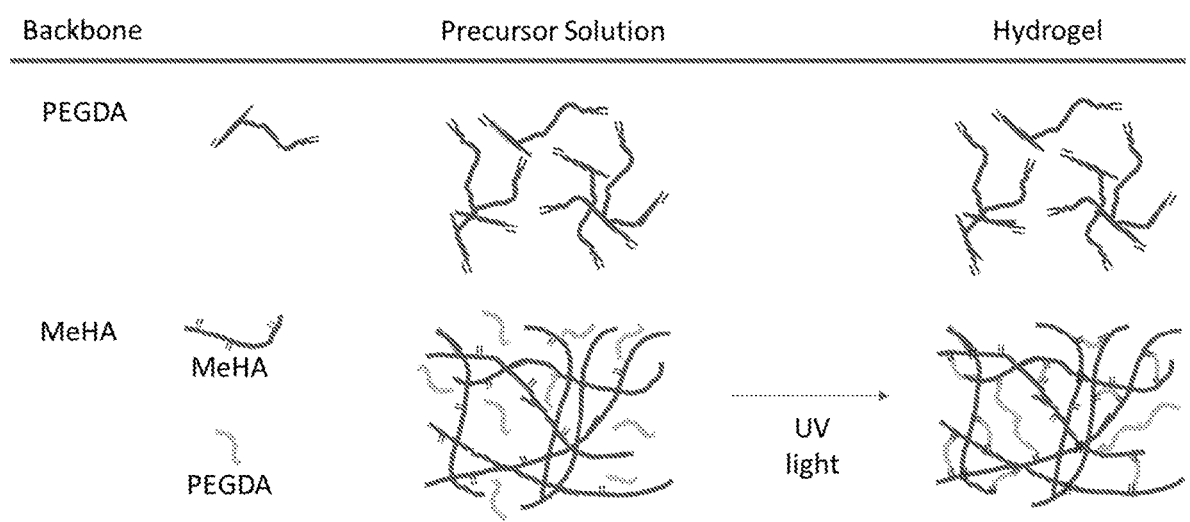

The present invention is broadly concerned with hydrogel microparticles for the localized delivery and sustained release of therapeutic cells and tissues. The hydrogel microparticles protect the implanted cells from initial degradation and wash-out under physiological conditions (biodegradation), and control the kinetics of the release of the cells (and their therapeutic proteins and molecules) into the localized or systemic region over a period of several hours to several weeks or months. The hydrogel microparticles designed to degrade are eventually degraded in vivo by normal physiological processes over a period of days or weeks, and generally within less than 3 months. This means that the entire hydrogel has been degraded and washed away by normal physiological conditions within this time frame, such that substantially no hydrogel is left behind in the implanted area (it being appreciated that trace amounts of gel or polymer may still remain in the area, but in general not enough to act as an encapsulant any longer for the implanted cells). It will also be appreciated that in some indications, particularly where implanted at a joint, the microparticles are also subject to mechanical degradation through movement and impact at the joint site.

The hydrogel microparticles comprise a hydrogel matrix in which a therapeutically effective amount of cells is encapsulated. The cells can be eukaryotic or prokaryotic. Examples of prokaryotic cells include bacteria and archaea. Eukaryotic cells include animal cells, plant cells, and fungi. The cells can be non-proliferative or proliferative. Proliferative cells will further proliferate (increase) from the initial cell number encapsulated within the hydrogel before and/or during the period of implantation, or after they are released from the degrading hydrogel. Non-proliferative cells have a limited capacity for expansion in vitro, and will generally not increase from the initial cell number. However, due to the favorable conditions in the hydrogel microparticle, there is minimal cell death among encapsulated cells and the initial cell number for non-proliferative cells encapsulated by the hydrogel also does not appreciably decrease. In one or more embodiments, the initial viability of the cells after encapsulation in the microparticles remains at at least 50%, preferably at least about 70% viability, more preferably at least about 80% viability, even more preferably at least about 90% viability, and even more preferably at least about 95% viability after encapsulation, as compared to the viability of the starting cell population included in the precursor solution. In other words, less than 50% of the cell population is lost during encapsulation, preferably less than 30%, more preferably less than 20%, even more preferably less than 90%, and even more preferably less than 5% of the cell population is lost during the encapsulation process. This is due to the gentle encapsulation process as well as to the ability of cell media and nutrients to diffuse into the microparticles during storage. In other words, in one or more embodiments, the microparticles have low diffusion barriers.

In one or more embodiments, the cell population included in the hydrogel precursor solution will comprise from about 1 million to about 500 million cells per mL of hydrogel precursor solution, preferably from about 4 million cells to about 300 million cells per mL of hydrogel precursor solution, and in some embodiments from about 5 million to about 150 million cells per mL of precursor solution. In one or more embodiments, the hydrogel precursor solution will comprise approximately 15% by volume cells, cell clusters, or tissue to be encapsulated per mL of hydrogel precursor solution.

Examples of proliferative cells include stem cells and activated T-cells, while examples of non-proliferative cells include islets and differentiated neuronal cells. In either case, the cells (and their associated cellular products) are slowly released from the hydrogel into the localized region of implantation. Exemplary cellular products that may be secreted along with the cells include signaling molecules, therapeutic proteins, vesicles, antibodies, viruses, exosomes, and the like. These components with a protein base could be in their native form, or could be genetically modified. Likewise, the cellular components of the product could be native or genetically modified. The hydrogel microparticles allow the cells to be maintained in the localized region of implantation for a longer period of time compared to other carriers or unencapsulated cells, and provide a temporary, but sustainable, release of the cells and/or their signaling molecules, proteins, etc. to the region to improve the therapeutic effect of the implanted cells. It will be appreciated that cell loading will depend upon the size of the cells used and the size of each microparticle. In one or more embodiments, up to 50% of the volume of the microparticle is comprised of the encapsulated cells, cell clusters, and/or tissue, preferably the cell, cluster, and/or tissue loading ranges from about 10% to about 20% of the volume of the microparticle body. In general, from about 50 to about $1 \times 10^5$ cells can be encapsulated in each 1-mm microparticle, preferably from about 100 to about $1 \times 10^5$ will be encapsulated in each 1-mm microparticle.

In one or more embodiments, the microparticles are formed of weaker hydrogels that are eventually broken down in vivo within about 3 months (90 days) or less from the date of implantation, and are referred to herein as "degradable" hydrogels (it being appreciated that most hydrogels will ultimately eventually degrade). As used herein, "degradable" hydrogel microparticles are defined as being "sustained-release" but "quick-degrading," or "short-term" hydrogels, which will maintain their self-sustaining microparticle body for at least 24 hours in PB S and up to 3 months when implanted in vivo. Such degradable hydrogel microparticles will also break down and degrade under in vitro storage conditions (PBS and 37° C.) within about 6 months. In other words, the hydrogel matrix has "in vitro storage stability" of less than 6 months, which means it begins to hydrolyze and break apart from its self-sustaining body during storage in 6 months or less when stored in PBS at 37° C. In one or more embodiments, the degradable hydrogel microparticles are characterized as having a Q value of greater than 150, preferably character than 200. However, as demonstrated below, additional modifications to the crosslinking chemistry (e.g., use of hydrolytically-labile crosslinking agents), can yield microparticles with low Q values (strong initial matrix), but which break down fairly quickly and are nonetheless characterized as degradable hydrogel microparticles.

These degradable microparticles are contrasted with alternative embodiments, which concern durable hydrogel microparticles. Such durable hydrogel microparticles are also sustained-release, but for more long-term applications, such that they will not break down or degrade under storage conditions for at least 6 months in PBS at 37° C. In other words, the durable microparticles have "in vitro storage stability" of greater than 6 months. In one or more embodiment, durable hydrogel particles are shelf-stable in PBS at room temperature (27° C.) for one year or more. Preferably, when such durable hydrogel microparticles are implanted, they will not break down for at least 3 months, and more preferably for at least 6 months under normal physiological (aka normal in vivo clearance of foreign bodies via phagocytosis, degradation, adsorption, etc.) conditions.

In either case, the hydrogel microparticles can also be characterized as microspheres, microbeads, or hydrogel microparticles. They are in the form of individual self-supporting bodies that comprise a 3-dimensional hydrogel matrix and cells suspended, entrapped, or encapsulated in the hydrogel matrix. Sustained release compositions for implantation in a subject are also described herein. The sustained release compositions comprise a plurality of 3-dimensional hydrogel microparticles suspended in a pharmaceutically-acceptable delivery vehicle.

Suitable hydrogel precursor compounds for use in forming the microparticles include hydrogel-forming polymers, oligomers, and/or monomers, and as such are capable of forming a cross-linked or network structure or matrix (i.e., "hydrogel") through crosslinking, wherein liquid and cells may be retained, suspended, entrapped, and/or encapsulated within the interstitial spaces or pores of the resulting gelled structure or matrix body. Hydrogel precursor compounds for use in the invention are preferably non-alginate hydrogel precursor compounds. That is, the hydrogel precursor solution is preferably substantially free of alginate compounds, i.e., compounds based upon alginate, alginic acid, or salts or derivatives thereof. The term "substantially free," as used herein, means that the ingredient is not intentionally added to the composition, although incidental impurities may occur, or residual/trace amounts may be left behind from the manufacturing process. In such embodiments, the hydrogel precursor solution compositions comprise less than about 0.05% by weight, preferably less than about 0.01%, and more preferably about 0% by weight of such an ingredient, based upon the total weight of the solution taken as 100% by weight.

The hydrogel microparticles can advantageously be fabricated from a variety of slow-gelling polymer precursors, such as hyaluronic acid (HA) and polyethylene glycol diacrylate (PEGDA), polyethylene glycol maleimide (PEG-MAL), multi-arm PEGs, hyaluronan, fibrin, chitosan, collagen, heparin, polylactic acid (PLA), poly(L-lactic acid) (PLLA), polylactic-co-glycolic acid (PLGA), polycaprolactone (PCL), polyvinyl alcohol (PVA), polyvinylpyrrolidone (PVP), methacrylic acid (MAA), 2-hydroxyethyl methacrylate (HEMA), polyacrylamide (PAM) extracellular matrix, and functionalized varieties of the same (e.g., acrylated, methacrylated, thiolated, etc.) or multi-arm varieties of the same (e.g., 4-arm PEG, 8-arm PEG). However, any crosslinkable hydrogel precursor compounds would be suitable for use with the invention, with preferred compounds being biocompatible non-alginate homopolymers or copolymers, and particularly non-alginate block copolymers, as well as other types of crosslinkable monomers and/or oligomers. In general, the amount of polymer precursor included in the precursor solution will be less than 50% w/w. The amount will range from about 1% to about 50% w/w for high molecular weight (≥500 kDa, preferably ≥100 kDa), multi-substituted polymers, such as hyaluronic acid, and from about 5% to about 50% w/w for lower molecular weight polymers (<100 kDa, preferably ≤50 kDa) such as PEGDA or PEGMAL.

The crosslinking profile of the microparticles can be tuned by adjusting the molecular weight of the precursor compounds, as well as the selected crosslinker, crosslinking conditions, and crosslinking process. For example, "tighter" or faster crosslinks may be desired in some embodiments to achieve a smoother bead surface and/or stronger gel by limiting the ability of molecules to leech out of the droplet/core into the surrounding environment during crosslinking. This can be achieved both by increasing molecular weight of the precursor species (e.g. ~>40 kDa) and/or by decreasing the crosslinking time by adjusting the crosslinking chemistry or initiation method. However, increasing molecular weight of bifunctional precursor species (i.e. PEGDA) generally results in more diffuse gels due to decreased crosslink density. Further, hydrolytically labile crosslinkers can be used to create initially strong microparticles with low initial Q values to facilitate implantation of the cells into the site. However, such crosslinking agents will be quickly degraded under normal physiological conditions, thus releasing their payload quickly into the site of implantation. Crosslinking can be carried out by various mechanisms depending upon the particular hydrogel precursor compound. In one or more embodiments, the core/shell microparticles are combined with a hydrogel matrix crosslinker, preferably in solution. The crosslinker leaches through the alginate shell into the core/shell microparticles resulting in gelation (crosslinking) of the hydrogel precursor compound to form a 3-dimensional hydrogel matrix. The crosslinker will correspond to the hydrogel precursor compound, but can be varied to control the speed and level of crosslinking achieved within the resulting crosslinked matrix. In general, the crosslinker amount used in forming the microparticles will range from about 0.5 mM to about 30 mM depending upon the crosslinker and polymer system selected, preferably from about 1 mM to about 20 mM, more preferably from about 2 mM to about 15 mM, even more preferably from about 2.5 mM to about 10 mM, and even more preferably from about 2.5 mM to about 5 mM.

Suitable crosslinkers include photo- or thermal-initiated crosslinkers, chemical crosslinkers, such as acrylates, methacrylates, acrylamides, vinyl-sulfones, dithiols, and the like, which would be included as part of the alginate bath. Self-crosslinking hydrogel precursors could also be used. In these embodiments, a photoinitiator such as IRGACURE® 2959 (2-Hydroxy-4'-(2-hydroxyethoxy)-2-methylpropiophenone) or lithium phenyl-2,4,6-trimethylbenzoyl-phosphinate (LAP) may be included in the hydrogel precursor solution as the catalyst. The photoinitiator can also be included in the alginate bath. For chemical crosslinking systems, the crosslinking agent is typically provided in the alginate bath. For UV initiated crosslinking systems, the crosslinking agent can be included either in the alginate bath or in the hydrogel precursor solution along with the main polymer (backbone) species.

Table 1 provides examples of reactive groups from different backbone chemistries that can be used to form a hydrogel with the appropriate crosslinkers. Some of the reactions are initiated by UV light, while others are a chemical reaction.

TABLE 1

Reactive Groups and Crosslinking Chemistry

| Reactive Polymer (precursor) | Crosslinker | Crosslink Mechanism |
| --- | --- | --- |
| MeHA (methacrylated HA) | PEG diacrylate (PEGDA) | UV |
| | self-reactive | UV |
| AHA (acrylated HA) | dithiothreitol (DTT), PEG dithiol | chemical |
| | PEGDA | UV |
| | self-reactive | UV |
| ThHA (thiolated HA) | PEGDA, PEG divinyl sulfone, PEG dimaleimide | chemical |
| PHA (pentenoate HA) | DTT, PEG dithiol | UV |
| NorHA (norbornene HA) | DTT, PEG dithiol | UV |
| PEGDA | self-reactive | UV |
| PEG diacrylamide | self-reactive | UV |
| 4 or 8-arm PEGMAL | DTT, PEG dithiol | chemical |
| | self-reactive | UV |
| 4 or 8-arm PEG vinyl sulfone | DTT, PEG dithiol, ethylene glycol bis-mercaptoacetate (BMA) | chemical |
| | self-reactive | UV |
| 4 or 8-arm PEG acrylate | DTT, PEG dithiol, BMA | chemical |
| | self-reactive | UV |
| Collagen-SH (thiolated collagen) | PEGDA | Chemical |

Additional exemplary precursor compounds include, without limitation, non-alginate polysaccharides, collagen/gelatin, chitosan, agarose, and the like. These precursor compounds can be branched polymers with multiple arms or unbranched/linear polymer chains of a single backbone. They can further be functionalized by attaching proteins, drugs, or enzymes to the hydrogel to achieve control of cellular attachment, function, proliferation, or viability. A particularly preferred hydrogel precursor compound is hyaluronic acid, or a hyaluronic acid/PEG mixture. The precursor compound(s) can also be functionalized with various chemical entities added to the precursor compounds at the time of hydrogel fabrication. These chemicals would be bound to the hydrogel matrix as opposed to encapsulated in the interstitial voids for simple diffusion out of the microparticle. Examples would include the addition of cell supportive agents that could be functionalized such that they react with either the crosslinker or the hydrogel backbone. In fast degrading microparticles, these agents would be released locally along with the cells and cellular products encapsulated therein.

Again, preferred hydrogels are slow-gelling hydrogels, which as used herein means hydrogels having gelation rates insufficient to form a generally smooth, generally spherical construct upon contact of a gel precursor droplet with a solution containing a cross-linker. Slow-gelling hydrogels are generally considered those that do not instantaneously (or near instantaneously, e.g., within 5-10 seconds or so) form gel droplets when exposed to crosslinkers. Biocompatible hydrogels are also particularly preferred, depending upon the designated end use of the hydrogel. As used herein, "biocompatible" means that it is not harmful to living tissue or to cells encapsulated within the matrix, and more specifically that it is not biologically or otherwise undesirable, in that it can be administered to a subject without excessive toxicity, irritation, or allergic or immunogenic response, and does not cause any undesirable biological effects or interact in a deleterious manner with any of the other components of the composition in which it is contained. Biocompatible hydrogels would be selected to minimize any adverse side effects in the subject, as would be well known to one of skill in the art. Additional optional ingredients that may be included with the hydrogel precursor include fibronectin, laminin, collagen, other components of the extracellular matrix, and the like, including synthetic versions thereof.

In general, the technique for preparing the microparticles is described in detail in U.S. Pat. No. 9,642,814, filed Jun. 3, 2015, incorporated by reference herein. The method involves preparing a hydrogel precursor solution comprising the hydrogel precursor compound, cells to be encapsulated, and a divalent cation (e.g., calcium, barium, strontium, and combinations thereof), dispersed or dissolved in a solvent system. The divalent cations are dispersed or dissolved in the solvent system along with the hydrogel precursor compound. The divalent cations should be included in the solution at a level of from about 0.025 moles/liter to about 0.25 moles/liter, based upon the total volume of the solution taken as 100%.

Figure 2:
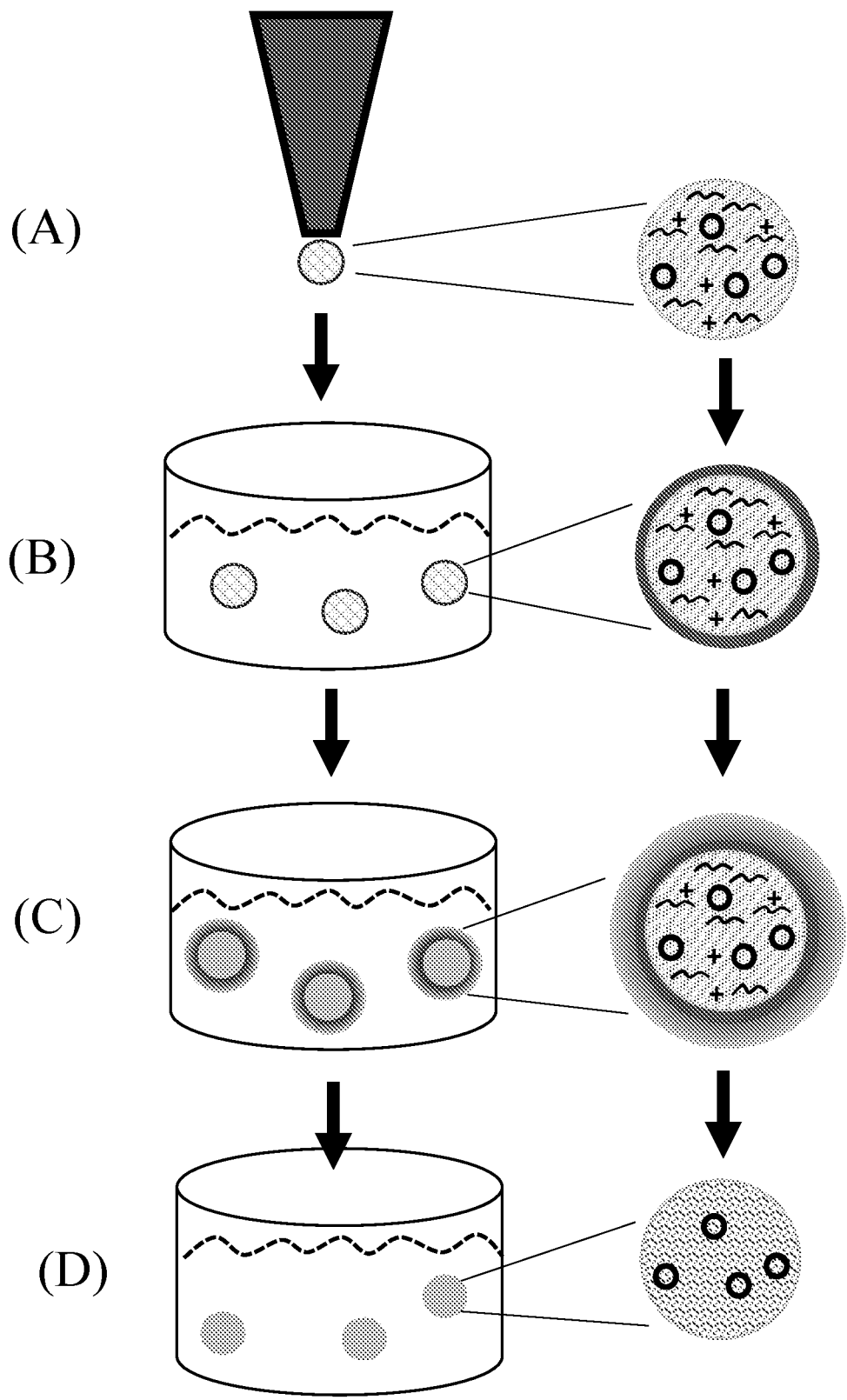
FIG. 2 is an illustration of a process for forming the microparticles, including (A) droplet formation, (B) incubation in the alginate bath, (C) formation and thickening of the alginate shell, and (D) crosslinking of the hydrogel core followed by removal of the alginate shell to yield the hydrogel microparticles.

The hydrogel precursor solution can also include optional hydrogel crosslinking agents, catalysts, additives, media, nutrients, pH buffers, density modifying agents, viscosity modifying agents, or the like. The hydrogel precursor solution is then combined with alginate to initiate gelation of the alginate around the hydrogel precursor solution (via an "inside out" gelation process) to yield core/shell microparticles. Each core/shell microparticle comprises an alginate shell surrounding a liquid core, which comprises the hydrogel precursor solution. As illustrated in FIG. 2, this generally involves (A) dropwise addition of the precursor solution to (B) an alginate bath, such as by generating/extruding droplets of the precursor solution that are dropped or sprayed into the alginate bath. The amount of alginate in the solution can be varied, but can range from about 0.1% to about 2.0% weight/volume, based upon the total volume of the solution taken as 100%. In general, the viscosity of the alginate solution should be less than the viscosity of the hydrogel precursor solution. The viscosity of an alginate solution depends upon the alginate concentration and average molecular weight of the alginate polymer (i.e., length of alginate molecules or number of monomer units in the chains), with longer chains resulting in higher viscosities at similar concentrations. In one or more embodiments, the viscosity of the alginate solution will range from about 1 to about 20 cP, and preferably from about 1 to about 4 cP at room temperature (~20 to 25° C.). More specifically, the ratio of viscosity of the hydrogel precursor solution to the viscosity of the alginate solution should be greater than 1 at room temperature. In one more embodiments, the ratio of viscosity of the hydrogel precursor solution to the viscosity of the alginate solution is from about 1:1 to about 1000:1. In one or more embodiments, the ratio of viscosity of the hydrogel precursor is about 20:1. In one or more embodiments, the viscosity of the hydrogel precursor solution is from about 1 up to about 500 cP, with about 40 to about 100 cP at room temperature being particularly preferred. The pH of the alginate bath should range from about 6.2 to about 7.8 and preferably from about 6.6 to about 7.4.

As illustrated in (B) and (C), the alginate shell forms from the inside out, and thickens around the droplets as the cations leach from the precursor solution droplet. In other words, the presence of the cation in the droplet causes alginate in the bath to agglomerate to the surface and crosslink around the droplet. Next, gelation of the hydrogel precursor compound in the liquid core is initiated, such as by crosslinking and/or polymerization, to yield core/shell crosslinked microparticles. Each core/shell crosslinked microparticle comprises the alginate shell and a gelled core comprising a crosslinked, 3-dimensional hydrogel matrix and entrapped cells. Crosslinking can be chemically induced, thermally induced, or photoinitiated, depending upon the particular precursor solution prepared. For example, the hydrogel crosslinker can be included in the alginate bath and diffuse through the alginate shell to crosslink the hydrogel microparticle in the core. Alternatively, the core/shell microparticles could be subjected to a source of UV radiation to initiate crosslinking in the hydrogel microparticle core. UV exposure times range from about 1 min. to about 10 min., preferably from about 2 min. to about 8 min., even more preferably from about 2.5 min. to about 5 min. The wavelength of the UV exposure will depend upon the photoinitiator and/or polymer system selected, but will generally range from about 100 nm to about 400 nm, preferably from about 315 nm to about 400 nm, and more preferably about 365 nm.

Unlike the ionic bonds of alginate-type microparticles, the inventive microparticles involve covalent crosslinking of the hydrogel precursor compounds, as illustrated in FIG. 1. The PEGDA example shows the diacrylate chemistry at the ends of the PEG backbone (black lines) with reactive sites indicated by the double red lines. PEGDA molecules crosslink with each other, creating the final hydrogel formulation. In contrast, the MeHA backbone (blue lines) with reactive groups shown dispersed on the chain (red double lines) is covalently crosslinked with PEGDA (FIG. 1). As such, it will be appreciated that the precursor compounds are chemically altered in the final product via the crosslinking reaction to yield the crosslinked hydrogel matrix. For example, in one or more embodiments, the hydrogel matrix consists essentially (or event consists) of a crosslinked network of PEG and HA polymers containing thioether and ester crosslink bonds (e.g., for thiolated HA). However, it will be appreciated that the matrix may include trace amounts of unreacted precursor compounds, functional groups, and the like remaining in the network. Other examples of possible hydrogel matrix and crosslinks are provided in Table 1. The list provides examples, but is not exhaustive. Examples of backbone molecules that can be used with the chemistry listed in Table 1 include Chitosan, Agarose, Chondroitin Sulfate or a combination of molecules. Bonds formed between the backbones include chemical bonds with thioesther plus an ester, a thioesther plus an ester and a methyl on a beta carbon, a thioether sulfone, or a thioether succinimide. But other chemical bonds may be used. Photo (free radical) bonds could include ester plus ether or amide plus ether. It will be appreciated that there are increasingly complex combinations that can be utilized such that possible combinations are virtually limitless.

Once the core has been gelled, the alginate shell is then removed (e.g., with a chelating agent, and/or mechanical agitation, such as sonication) to yield the self-sustaining hydrogel microparticles or microbeads and cells entrapped therein, as illustrated in (D). In other words, the alginate shell is not part of the final product and is always removed before use of the microparticles. The resulting hydrogel microparticles can be collected from the solution using a mesh screen or other device, and may be rinsed or suspended in medium or appropriate nutrients, as desired. Again, the resulting degradable hydrogel microparticles are preferably substantially free of alginate.

This technique can be used to entrap/encapsulate cells, cell clusters, tissues, combinations thereof, and fragments thereof in the hydrogel microparticles. Cells can be naturally-sourced or freshly isolated primary cells, cultured or expanded cells, established cell lines, differentiated or undifferentiated, engineered or genetically-modified, and the like. Non-limiting examples of cells and tissues include islets, islet clusters, hepatocytes, stem cells, and related cells and tissue, as well as endocrine cells, stem cell clusters, thyroid clusters, adrenal gland clusters, pituitary clusters, and other 3-dimensional cell clusters for tissue engineering or cell-based treatments. Combinations of cell types and/or tissues could also be used in the microparticles (e.g., a primary cell type in combination with stem cells). The microparticles can also include within the hydrogel matrix components of cell culture media supportive of cell maintenance and growth, depending upon the cell type. Exemplary media components include one or more of serum, nicotinamide, antibiotics (penicillin, amphotericin B, streptomycin, gentamicin sulfate), amino acids (alanine, arginine, aspartic acid, glutamine, etc.), pH buffers (sodium bicarbonate), inorganic salts (source of sodium, potassium, magnesium, and calcium ions), carbon source (glucose, galactose, fructose, maltose, sodium pyruvate), proteins and peptides (albumin, transferrin, fibronectin, activin, insulin), fatty acids and lipids, vitamins (A, D, E, K, B, nicotinamide), minerals and trace elements (zinc, copper, selenium), hormones, growth factors, and the like. Complete media, basal media, and media components are commercially available, including, without limitation, Eagle's Minimum Essential Medium (EMEM), Dulbecco's Modified Eagle's Medium (DMEM), RPMI-1640, Ham's Nutrient Mixtures, Iscove's Modified Dulbecco's Medium (IMDM), CMRL-1066, and the like.

The resulting hydrogel matrix is characterized as being a semi-rigid network that is permeable to liquids and gases, but which exhibits no flow and retains its integrity in the steady state. Hydrogels can be considered a solid and can also be described as having a viscosity approaching infinity. The hydrogel matrix is a 3-dimensional self-sustaining body. The term "self-sustaining body" means that the hydrogel matrix, once formed, retains its shape without an external support structure, and is not susceptible to deformation merely due to its own internal forces or weight. The self-sustaining body is not pliable, permanently deformable, or flowable, like a jelly, putty, or paste, but is resilient, such that the matrix body may temporarily yield or deform under force. In other words, the self-sustaining body will recoil or spring back into shape after minor compression and/or flexing—it being appreciated that the hydrogel matrix will crack, break, or shear under sufficient exertion of external pressure or force (and will not thereafter recover). The hydrogel microparticle is a matrix-type capsule that holds the fill material throughout the bead, rather than having a distinct shell as in a core-shell type capsule. As noted above, the hydrogel microparticle is also a self-sustaining body. In one or more embodiments, the resulting microparticles are substantially spherical in shape. Advantageously, the particle size is highly customizable depending upon the capabilities of the selected droplet generator. In one or more embodiments, the resulting hydrogel microspheres or microparticles have an average (mean) maximum cross-section surface-to-surface dimension (i.e., in the case of a spherical or ellipsoidal microsphere, its diameter) of greater than 30 µm, and in some case greater than 300 µm. In one or more embodiments, the resulting hydrogel microspheres or microparticles have an average (mean) maximum surface-to-surface dimension of less than about 5 mm. Preferably, the resulting hydrogel microspheres or microparticles have an average (mean) maximum surface-to-surface dimension of less than about 2 mm, more preferably from about 30 µm to about 2 mm, even more preferably ranging from about 50 µm to about 1.5 mm, more preferably from about 150 µm to about 1.5 mm, even more preferably from about 300 µm to about 1.4 mm. In some cases, smaller microparticles ranging from about 30 µm to about 750 µm or 500 µm in size can be formed. For ease of reference, this cross-section dimension is referred to herein simply as the "size" of the microparticle. In any event, the hydrogel microparticles of the invention are not nanosized and would not be considered nanoparticles or any other kind of nanocrystalline shape.

The hydrogel microparticles are particularly suited for localized therapeutic treatment for acute or chronic conditions where a short-term treatment protocol may be used to alleviate such conditions. Examples include localized delivery (e.g., direct injection) of cells, cell clusters, and/or tissues for bone or cartilage repair (e.g., in a joint) and general protection of transplanted therapeutic cells, cell clusters, and/or tissues from the host immune system. The microparticles protect the encapsulated cells, cell clusters, and/or tissues from the immune system over a short duration of time (e.g., days, weeks, up to three months), releasing their therapeutic benefits, until the hydrogel breaks down and is washed away by normal physiological processes. Systemic treatments are also contemplated. In one or more embodiments, the microparticles are not for delivery of small molecule therapeutics and are preferably free of such drugs, except to the extent such drugs are included in the microparticles as cell supportive active agents (e.g., to ensure success of the cells and implant, such as immunosuppressive agents), but not as the active or therapeutic agent per se.

For treatment methods, the microparticles are suspended or dispersed in a suitable delivery vehicle for administration to the subject. Exemplary delivery vehicles will include biocompatible liquid suspensions, viscous solutions, putties, pastes, or gels in which the microparticles are distributed, and preferably include nutrients and components supportive of maintenance and growth of the cells, cell clusters, and/or tissues to be administered. Cell culture media, such as described above, which can be further supplemented depending upon the cell or tissue type, is a preferred vehicle. Saline solutions or other buffered solutions may also be used as vehicles for delivery. The methods generally comprise (or consist of) locally administering a therapeutically effective amount of the resulting microparticle composition to the patient, such as to the location of inflammation, injury, arthritis, degeneration, etc. in the patient. Administration generally includes direct injection of the microparticle composition at or near the site of inflammation, injury, arthritis, degeneration, etc. Advantageously, the sustained release microparticle composition confines the administered cells, cell clusters, and/or tissues in the localized region for a therapeutically effective period of time, such that the slowly released cells, cell clusters, and/or tissues and/or their cellular components or products are released in the localized region to alleviate or reduce the severity of the condition in the patient. As used herein, the term "therapeutically effective" refers to the amount and/or time period that will elicit the biological or medical response of a tissue, system, animal or human that is being sought by a researcher or clinician, and in particular elicit some desired therapeutic effect. For example, in one or more embodiments, therapeutically effective amounts and time periods are those that reduce inflammation and initiate or promote healing of the site of inflammation, injury, arthritis, degeneration, etc. One of skill in the art recognizes that an amount or time period may be considered therapeutically effective even if the condition is not totally eradicated but improved partially.

The treatment may be repeated via additional injections or infusions if necessary. Those skilled in the art will appreciate that treatment protocols can be varied depending upon the particular inflammation, injury, arthritis, degeneration, condition or healing status, and preference of the medical or veterinary practitioner or researcher. For example, neuronal repair, such as for repair of a spinal cord injury or degenerative disease could be potentially treated with an injection of microencapsulated stem cells into the epidural space or extradural in the region of the lesion. The degradable hydrogel microparticle is designed to release stem cells into the region immediately for the stem cells to interact directly with the environment, or a degradable microparticle designed to last longer (e.g., ~1-3 months) could microencapsulate stem cells to release positive growth factors into the area, while slowly degrading away, releasing the cells for destruction and degradation until nothing is left behind. Likewise, cardiac repair after a heart attack could be improved by the localized release of cells or growth factors from cells, cell clusters, and/or tissues that are microencapsulated and placed in the region of injury. Another example includes treatment of non-functioning glands via hormone therapy, such as the return of thyroid function by placing microencapsulated thyroid cells, cell clusters, and/or tissues in the neck or near/adjacent site, if scar tissue is present from removal or abatement of the thyroid gland. Additional examples for durable hydrogel microparticles include the local delivery of neurotransmitters involved in neuroendocrine disorders, release of bone-promoting factors delivered near a non-healing fracture, the systemic release of molecules such as atrial natriuretic peptide to treat congestive heart failure, the release of clotting factors in the treatment of hemophilia, or encapsulation of engineered or transgenic cells that produce a variety of biologically active substances.

In one or more embodiments, "empty" hydrogel microparticles can also be administered as part of a joint lubricant treatment. In other words, the presence of the hydrogel itself provides the therapeutic relief to the patient, without needing cells or any other active agents in the particle itself.

A particular advantage of the inventive compositions and microparticles is their improved "stickiness" as compared to alginate or other types of microparticles when implanted. That is, the microparticles have a tendency to adhere or cling to the tissue in vivo at the site of implantation and shown in the photographs in the examples below. This further enhances the effectiveness of the treatment by maintaining the localized release of the cells, cell clusters, and/or tissues and their cellular products at the site of implantation. Further, the microparticles demonstrate no induction of any inflammatory response at the site of implantation, and/or any foreign body response, including lymphocytes or collagen ring formation.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth methods in accordance with the invention. It is to be understood, however, that these examples are provided by way of illustration and nothing therein should be taken as a limitation upon the overall scope of the invention.

We show that the formulation(s) of HA utilized in the examples degrade over a period of less than 3 months. In contrast, formulations of PEGDA are more durable. We compare the properties of the products manufactured in this manner by contrasting degradable versus durable microparticles. Those comparisons include physical and chemical differences, in vitro and in vivo stability, cell morphology, function and migration within the end-product microparticles, and the ability of the final product microparticles to attach to tissues in vivo, thus localizing their application within the body.

Example 1

Physical and Chemical Differences in Durable Versus Degradable Hydrogel Microparticle Final Product Introduction The concept of cell encapsulation was first popularized in 1980 by Lim and Sun, who showed that islets embedded in alginate hydrogel microparticles could reverse diabetes in rats without the need for immunosuppression, albeit for only a few weeks. This initial success was followed by research aimed at better understanding and improving the process. Great progress has been made over time in this field, yet alginate microspheres continue to notoriously suffer from issues with long-term bio-incompatibility. Despite its limitations, alginate has persisted as the clear material of choice for cell encapsulation due to its unique, nearly instantaneous cross-linking kinetics, enabling straightforward fabrication of convenient, injectable microparticles.

Conversely, other hydrogels typically can only be prepared as bulk, macroscopic structures due to slower cross-linking rates. Some protocols have been developed for producing microspheres using alternative hydrogels such as polyethylene glycol, agarose, chitosan, or hyaluronic acid. However, these approaches are based on oil-emulsion techniques, which are generally inappropriate for cell encapsulation and transplantation due to their dependence on non-aqueous solvents and poor process control.

As applications of cell encapsulation continue to grow in number and sophistication, the ability to fabricate convenient, injectable, biocompatible microparticles using advanced biomaterials would be decidedly useful. Here, a new method for producing hydrogel microparticles described in U.S. Pat. No. 9,642,814, filed Jun. 3, 2015 and incorporated by reference herein, termed Core-Shell Spherification (CSS) was tested. This method was strategically designed for use with hydrogels with much slower gelation rates compared to alginate, enabling the production of hydrogel microparticles with a variety of chemical, physical and bioactive properties. Furthermore, the method does not use oil-emulsion techniques and was developed for standard GMP-ready equipment and materials to better facilitate accessibility, scale and regulatory compliance. We demonstrate microparticle production via CSS using two popular hydrogels, hyaluronic acid (HA) and polyethylene glycol diacrylate (PEGDA).

Methods

Cytotoxicity of CSS Crosslinking Procedures

The cytotoxicity of calcium, a component in the CSS process, was tested by exposing canine islets to solutions containing either 100 mM or 200 mM calcium chloride, 10 mM HEPES buffer, and 20% PEGDA, MW 3,400 Da (Laysan Bio, Inc.) for 5, 10 or 15 minutes. A group was also exposed to 100 mM calcium chloride without PEGDA to evaluate the effect of calcium alone. Islets were suspended at approximately 5,000 IEQ/mL in the test solutions to emulate the high cell loading density associated with the encapsulation process. After calcium exposure, islets were washed twice with supplemented CMRL 1066 islet media and then incubated at 37° C. and 5% $CO_2$ for 3 hours prior to assessment.

Dead cells were identified using propidium iodine staining and fluorescence microscopy. Fluorescence micrographs were captured with a Cytation 5 Imaging Multi-Mode Reader (Biotek Instruments, Inc, 531/647 nm ex/em). Cell death was quantified by calculating the ratio of red (dead) pixels to total islet pixels using Adobe Photoshop. Twenty-five individual islets were analyzed per group and were distinguished from non-islet tissues via dithizone staining. Results are reported as the average viable cell fraction and normalized to islet viability of the matched, untreated controls (i.e., islet from the same batch in culture medium).

For PEGDA and methacrylated hyaluronic acid (MeHA) microparticles, photocrosslinking was utilized. Thus, studies examining the toxicity of ultraviolet light (UV) and the photoinitiator were first conducted. Canine islets were suspended in Dulbecco's phosphate buffered saline (DPBS) containing 0, 0.025 or 0.05% (w/v) of the photoinitiator, IRGACURE® 2959. Approximately 50 IEQ were loaded into wells of a 24-well plate and irradiated with long-wave ultraviolet (UV) light for 3, 5 or 10 minutes. Plates were irradiated using a PortaRay 400 UV lamp in low-power mode at a distance of 6", corresponding to approximately 40 mW/cm$^2$ according to manufacturer data (Uvitron International). After exposure, islets were washed twice with supplemented CMRL 1066 islet media and incubated at 37° C. and 5% $CO_2$ for 3 hours prior to assessment. Cell death was evaluated via propidium iodide staining and quantified as described in the previous section.

Fabrication of MeHA Hydrogel Microparticles

Once non-toxic levels of crosslinkers were determined, microparticle production was initiated. A general schematic of the CSS process for hydrogel microparticle fabrication is provided in FIG. 2. The MeHA was first synthesized by reacting HA (MW 1 MDa, Lifecore Biomedical) with a 50-fold molar excess glycidyl methacrylate (Sigma) in the presence of triethylamine and tertbutyl ammonium bromide (Sigma) in a 50:50 water:DMSO mixture for 5 days. MeHA was then dialyzed against deionized (DI) water for 2 days and then lyophilized. The degree of methacrylation was determined to be 54-72% using $^1$H NMR (Avance AV-III 500, Bruker) by calculating the ratio of the relative peak area of methacrylate protons to methyl protons.

A methacrylated HA:PEGDA polymer blend (MW 3.4 kDa, Laysan Bio, Inc) was prepared at 2.5%:1% (w/w) in a custom buffer containing 100 mM calcium chloride, 15 mM HEPES, and 0.05% (w/v) IRGACURE® 2959 with OptiPrep (CosmoBioUSA, Inc.). In this embodiment, a low concentration of PEGDA was added to the MeHA solution as a crosslinker to increase crosslinking density of the hydrogel. The solution was passed through a 0.22-micron filter. The viscosity of the precursor solution was measured with a Cannon-Manning Semi-Micro calibrated glass capillary viscometer at room temperature.

The precursor was extruded via automated droplet generator into a stirred bath of 0.15% (w/v) sodium alginate (Protanal LF 10/60, FMC Corp.) containing 300 mM mannitol, 0.1% Tween 20, and adjusted to pH 7.6 using a custom 15 mM HEPES buffer. For the MeHA precursor, 0.05% (w/v) IRGACURE® 2959 initiator was also added to the alginate bath to maintain equilibrium of the IRGACURE® between droplet and bath and minimize leaching of the IRGACURE® from the droplet once dropped into the bath (which would reduce cross linking). A Buchi 395-Pro Encapsulator (Buchi Corporation, Newcastle, DE) equipped with an air jet nozzle system and a 400-micron diameter inner fluid nozzle within a 1.5 mm concentric air nozzle was used for droplet generation. The droplets were extruded using compressed nitrogen. The MeHA droplets formed core-shell constructs, having respective alginate shells encapsulating the hydrogel precursor solution/droplet core. The hydrogel precursor solution/droplet core was then irradiated with long-wave UV light to initiate free radial photo-crosslinking of the MeHA and PEGDA. Irradiance at the center of the bath was approximately 40 mW/cm$^2$ (PortaRay 400, Uvitron International). Irradiation was applied continuously during extrusion of the precursor solution and for 1 minute after extrusion to ensure complete cross-linking of the hydrogel core in the core-shell constructs. Core-shell constructs were next rinsed in a 25 mM citrate buffer in DPBS for 5 minutes under mild stirring to dissolve the alginate shells. The resulting microparticles were collected using a steel mesh screen and suspended in DPBS. A second rinse in 50 mM citrate for 5 minutes was performed to ensure complete dissolution and removal of the alginate shell.

Fabrication of ThHA Hydrogel Microparticles

The ThHA precursor was prepared by dissolving thiolated HA (HyStem, Biotime Inc) at 1.2% (w/w) in a custom buffer containing 100 mM calcium chloride and OptiPrep to adjust solution density (CosmoBioUSA, Inc). The pH of the precursor solution was adjusted using a custom 15 mM HEPES buffer to be approximately 7.0 to reduce disulfide bridging of the ThHA macromers. The solution viscosity was measured as described above. Core-shell constructs were produced as described above. However, cross-linking was achieved via chemical cross-linking (vs. free radical photo-crosslinking with MeHA microparticles). Terminal acrylate groups of the PEGDA molecules bond with the thiol groups on the ThHA via Michael-type addition. Briefly, the precursor solution generated core-shell constructs with a ThHA precursor core and alginate shell upon contact with the alginate bath. The alginate bath also contained 0.4% PEGDA acting as a crosslinker (MW 3.4 kDa, Laysan Bio, Inc), and was stirred gently for 5 minutes. Both the bath and the hydrogel precursor can contain crosslinking agent (e.g., PEGDA), but in this protocol it is preferably included in the bath only. Cross-linking proceeded via diffusion of the smaller 3.4 kDa PEGDA molecule into the core, through the alginate shell. The bath was then diluted by half with DPBS, which reduced the solution pH to 7.4. Stirring continued for an additional 30 minutes to cross-link the HA precursor within the core. The core-shell constructs were collected, and the alginate shells were removed as described above to yield the microparticles.

Fabrication of PEGDA Hydrogel Microparticles

The PEGDA hydrogel precursor solution was prepared by dissolving PEGDA 3.4 kDA and 20 kDa (Laysan Bio, Inc.) at 18% and 12% (w/w), respectively, in a buffer containing 100 mM calcium chloride, 10 mM HEPES, and 0.025% (w/v) IRGACURE® 2959. The solution was filtered using a 0.22-micron syringe and the viscosity was measured as described above. The precursor was extruded into a stirred alginate bath as for the MeHA microparticles, but with 0.025% (w/v) IRGACURE® 2959. All solutions for MeHA and PEGDA microparticle fabrication were prepared in water degassed by sonication to eliminate excess oxygen, a known photo-cross-linking inhibitor. Core-shell constructs were irradiated as described above to achieve cross-linking of the core. Constructs were processed further as described above to dissolve the alginate shells and yield the hydrogel microparticles.

Fabrication of AHA Hydrogel Microparticles

First, AHA was synthesized by reacting HA (MW 1 MDa or 200 kDa, Lifecore Biomedical) with acryloyl chloride and glycidol (TCI) in the presence of triethylamine and N-dimethylformamide (Sigma) for 5 days. AHA was then dialyzed against deionized (DI) water for 5 days and then lyophilized. The degree of acrylation was determined to be 53-72% using $^1$H NMR (Avance AV-III 500, Bruker) by calculating the ratio of the relative peak area of acylate protons to methyl protons. The AHA precursor solution was then prepared by dissolving the acrylated HA at 4% in a custom buffer containing 100 mM calcium chloride, 15 mM HEPES buffer, and 0.05% (w/v) IRGACURE® 2959. The precursor solution was filtered using a 0.22-micron syringe and the viscosity was measured as described above. The precursor was extruded into a stirred alginate bath as for the MeHA particles. Core-shell constructs were irradiated as described above to achieve cross-linking of the core. Alginate shells were removed using a citrate buffer as described above to collect AHA hydrogel microparticles.

Physical Properties and Size Distribution of Hydrogel Microparticles

Images of 100 individual microparticles were captured using a Biotek Cytation 5 Multi-mode imaging reader. The microparticles imaged in multi-well plates in PBS, and the images were analyzed in Adobe Photoshop to determine the average microparticle diameter and size distribution for each microparticle type (N=100 microparticles). Hydrogel microparticles were further characterized by determination of the swelling ratio, "Q", for each microparticle type, which is the ratio of the swollen hydrated mass to the dry mass. Microparticles were immersed in excess DI water for 24 hours prior to measurement to remove dissolved salts and to ensure equilibrium swelling was reached. Microparticles were removed of excess surface moisture and then weighed on a pre-weighed watch glass. Subsequently, the microparticles were dried overnight at 60° C. and reweighed to obtain the dry mass (N=3).

Diffusion Characteristics of Microparticles

Hydrogel microparticles were incubated overnight in 0.1 mg/mL solutions of FITC-labelled dextrans in DPBS with molecular weights of 10, 40, 70, and 500 kDa (Invitrogen Molecular Probes) following procedures previously published. Microparticles were rinsed with DPBS and imaged via laser scanning confocal microscopy to monitor efflux of the probes (Olympus Fluoview 300). Micrographs were captured at set time points between 3 and 30 minutes after removal of the microparticles from the FITC-dextran incubation solutions.

Pore Size Calculations

Empty PEGDA and MeHA microparticles were examined using Environmental Scanning Electron Microscopy (ESEM) conducted on a FEI Quanta 600F ESEM instrument. The samples were immersed in water on a cool stage with temperature set at 6 C in the SEM chamber. The chamber was then evacuated to 1000 Pa and the relative humidity maintained at 100%. Images were captured with a magnification of 10,000×. Standard SEM images were also collected. For those images, samples were critical point dried or lyophilized and coated with 10 nm platinum and imaged at 5 kV on the same ESEM instrument in high vacuum mode. SEM images were captured at a magnification of 1000×.

Results

Core-Shell Spherification Procedure

Figure 3:
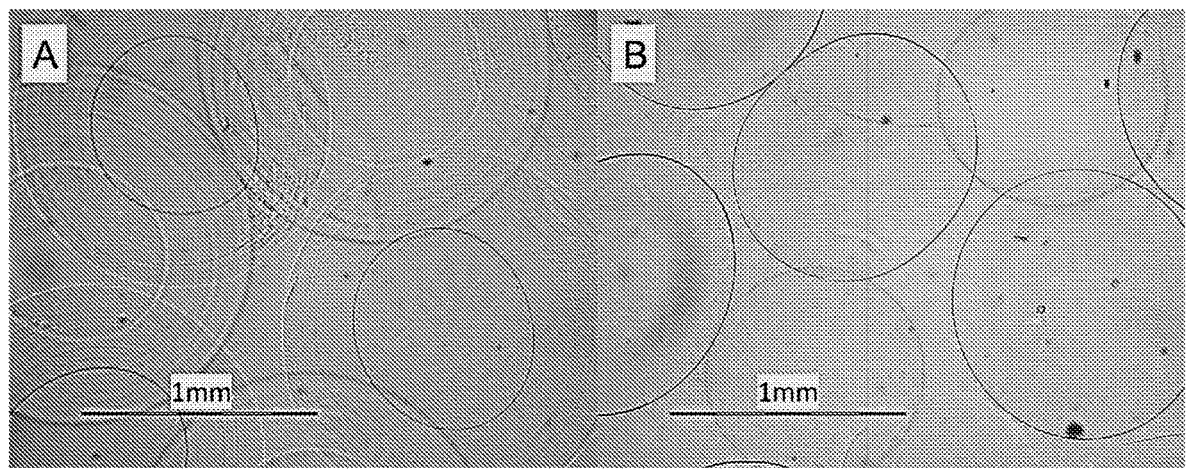
FIG. 3 shows images for the (A) alginate shell around the microparticles; and (B) the hydrogel microparticles after alginate shell removal.
Figure 4:
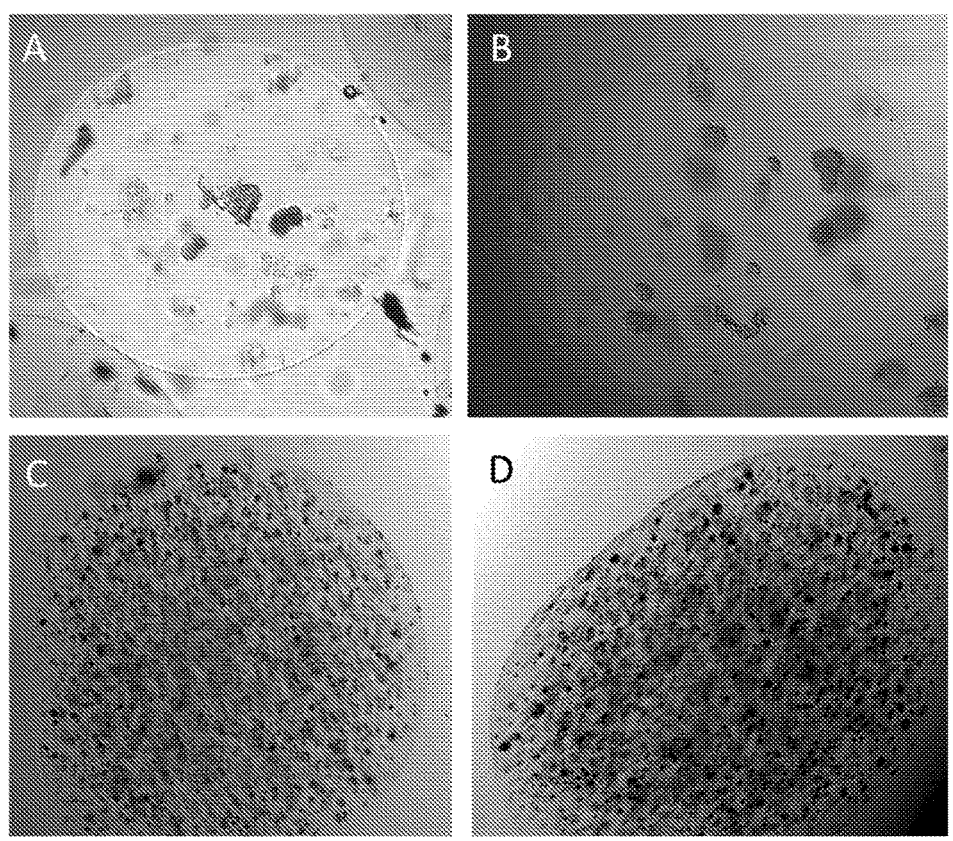
FIG. 4 shows images of (A) spherical durable PEG-based microparticles loaded with islets, (B) ellipsoidal PEG-based microparticles loaded with islets, (C) flat-edged, MeHA-based microparticles loaded with stem cells, and (D) ellipsoidal MeHA-based microparticles loaded with stem cells.

Hydrogel microparticles were fabricated via the CSS method summarized in FIG. 2. The process starts with the slow-hardening hydrogel precursor solution (either functionalized PEG or HA) that is entrapped as a droplet in an alginate shell as it hits the alginate bath, providing time for the functionalized PEG or HA to harden. Alginate shells formed around the core microparticle are characterized by a concentric ring-link morphology (FIG. 3A). Subsequently, the alginate shell is removed, leaving only the inner core hydrogel behind (FIG. 3B). FIG. 3B shows the predominantly spherical shape of the microparticles. However, other shapes are acceptable for the final product. FIG. 4 provides additional examples of acceptable final product characteristics. FIG. 4A provides an example of a more durable (aka long-lasting) PEGDA-based microparticle having a slower degradation profile loaded with canine islet cells with a completely spherical shape. FIG. 4B shows a similar durable PEGDA-based microparticle loaded with islets, but with an elongated shape; a 3D ellipsoidal shape. FIG. 4C illustrates a faster-degrading (aka short-term) MeHA-based microparticle with a faster degradation profile loaded with stem cells with a flat edge on the left side. FIG. 4D shows the same type of microparticle, but with a 3D ellipsoidal shape. All of these microparticles, as well as other related shapes such as teardrop or egg-shaped are functional examples the CSS microparticle final product.

Cytotoxicity Studies

Figure 5:
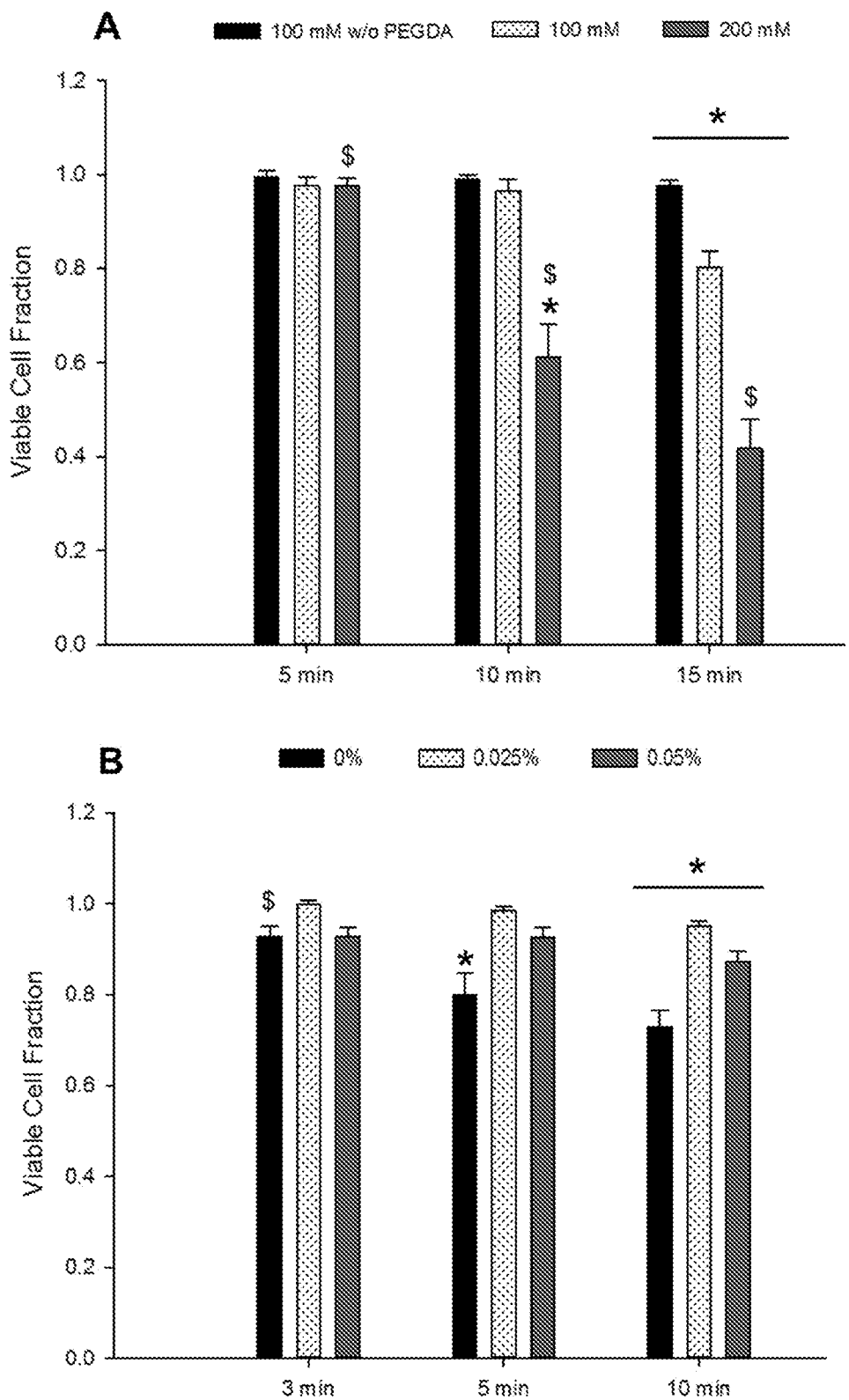
FIG. 5 shows results from the cytotoxicity studies and the (A) effects of calcium concentration and exposure time on the viability of canine islets, and the (B) effects of photoinitiator concentration and UV light exposure time on cell viability.

During the microparticle fabrication, while the alginate shell was still present, crosslinking is required for gelation of the core so that it will maintain a 3-dimensional, self-sustaining structure after the shell is removed. To optimize the process of CSS, the cross-linking components of the microparticle fabrication process were evaluated for cytotoxic effects on freshly dispersed cells (canine islets). FIG. 5A depicts the effects of calcium concentration and exposure time on the viability of canine islets. The three conditions tested were 100 and 200 mM calcium with PEGDA or 100 mM calcium alone. At the shortest measured exposure time of 5 minutes, no significant difference in cytotoxicity was observed for any group. All groups were above 97.5% viability compared to matched, untreated controls (islets from the same batch in culture medium). However, a significant drop in viability was seen in the 200 mM calcium group at each subsequent time point compared to the 5-minute measurement. Viability in the 200 mM calcium group was significantly lower than the two 100 mM groups at both 10 and 15 minutes. No differences were observed in either of the 100 mM groups through 10 minutes. However, at 15 minutes, the 100 mM group containing PEGDA showed a significant decrease in viability compared to the 5- and 10-minute time points and to the 100 mM group without PEGDA at 15 minutes. Interestingly, no significant change in viability was observed at any time point within the 100 mM group without PEGDA, which was 97.6% viable at 15 minutes compared to controls.

The effects of photoinitiator concentration and UV light exposure time on cell viability are shown in FIG. 5B. Canine islets were irradiated with ~40 mW/cm$^2$ long-wave UV exposure for 3, 5 and 10 minutes at IRGACURE® 2959 concentrations of 0, 0.025, and 0.05% (w/v) and evaluated for cytotoxicity. Interestingly, the group containing no photoinitiator (IRGACURE® 2959) showed the highest degree of cytotoxicity. Viability in the 0% group was significantly lower at 5 minutes and 10 minutes compared to the 3-minute exposure time. Further, the 0% group was significantly less viable at 5 and 10 minutes compared to both IRGACURE®-containing groups. The only significant difference between the 0.025 and 0.05% groups was at 10 minutes, with viable cell fractions of 94.5 and 87.2%, respectively.

Physical Properties and Size Distribution of Hydrogel Microparticles

In order to fully test the new CSS platform, microparticles were produced from two different starting materials: HA and PEGDA. The HA production was further divided into thiolated HA (ThHA) and methacrylated HA (MeHA) to evaluate both chemically crosslinked and photo-crosslinked hydrogels, respectively, using the CSS platform. Table 2 provides the physical properties of the hydrogel formulations before and after cross-linking, as well as the average microparticle diameter and diameter range.

TABLE 2

Microparticle Fabrication Characteristics and Physical Properties

|  | ThHA Microparticles | MeHA Microparticles | PE Microparticles | GDA AHA Microparticles |
| --- | --- | --- | --- | --- |
| Polymer mass fraction in gel precursor | 1.2% | 2.5% MeHA 1% PEGDA 3.4 k | 18% PEGDA 3.4 k 12% PEGDA 20 k | 4% AHA |
| Precursor viscosity | 90 cSt | 190 cSt | 60 cSt | 50 cSt |
| Cross-linking mechanism | chemical: thiol-acrylate Michael-type addition | photo-initiated: free radical crosslinking | photo-initiated: free radical crosslinking | Photo-initiated: free radical crosslinking |
| Cross-linking time | 35 minutes | 60 seconds | 60 seconds | 5 minutes |
| Polymer mass fraction in final swollen particles | 3.6% | 0.95% | 5.8% | 0.39% |
| [1]mass swelling ratio "Q" | 27.7 | 105.7 | 17.3 | 256 |
| Particle size range (100 particle sample) | 406-776 μm | 1020-1370 μm | 424-1146 μm | 933-1332.5 |
| [2]Average final swollen diameter (CV %) | 637 μm (CV: 11.1%) | 1156 μm (CV: 6.1%) | 904 μm (CV: 15.7%) | 1095 |

[1]Swelling ratio "Q" is the ratio of the hydrated equilibrium mass to the dry mass of the gels.
[2]HA and PEGDA bead diameters were significantly different ($p < 0.001$).

Figure 6:
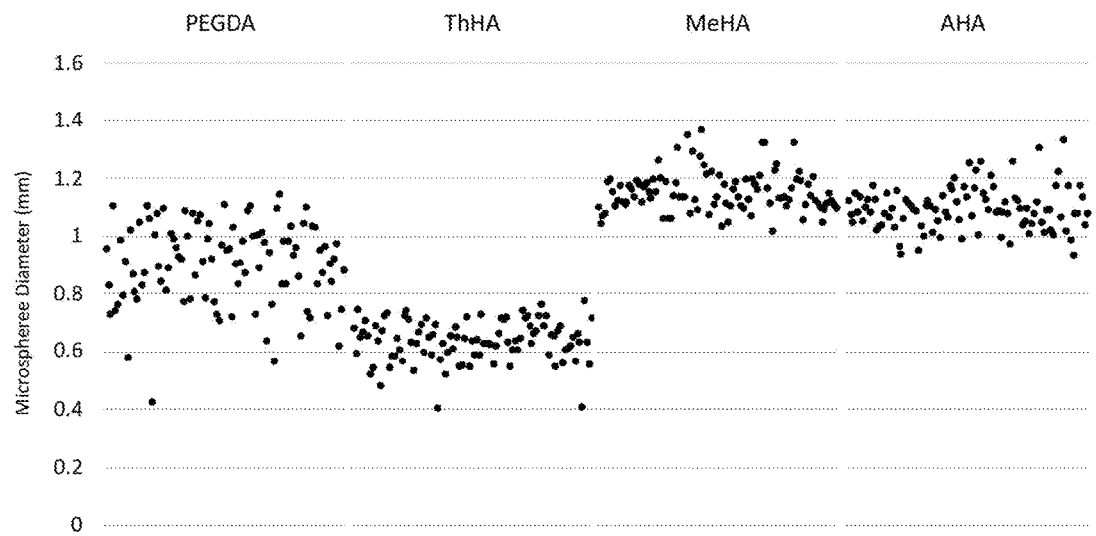
FIG. 6 is a graph plot of the diameters of 100 representative microparticles composed of ThHA, MeHA, PEGDA, or AHA, and their good mono-dispersity profiles.

The precursor mass fraction for the gel precursor was 30% for PEGDA while ThHA and MeHA were fabricated from a 1.2% and 2.5% solution, respectively. The high PEGDA precursor concentration was necessary to achieve a solution viscosity appropriate for forming well-shaped microparticles. Gel formulations and corresponding precursor viscosities are shown in Table 2. ThHA was the only chemically-crosslinked hydrogel and it required significantly more time to crosslink (35 minutes) compared to the photo-crosslinked gels (MeHA and PEGDA). The average diameter was greatest for the MeHA microparticles, followed by PEGDA and then ThHA microparticles, which were smaller than the other two groups. PEGDA microparticles exhibited the lowest equilibrium swelling ratio, "Q", indicating a more compact overall hydrogel. This is illustrated further in FIG. 6, which plots the diameters of 100 representative microparticles composed of ThHA, MeHA, PEGDA, or AHA, and illustrating good mono-dispersity of the microparticles, especially for the HA materials. ThHA microparticles were much smaller in size than PEGDA or MeHA, and had a narrower diameter range compared to PEGDA despite having been fabricated using the same droplet generation equipment and parameters prior to cross-linking. The average MeHA and AHA microparticle diameters were the highest of the four groups. Interestingly, PEGDA particles containing islets exhibited a slightly larger mean diameter, but improved mono-dispersity compared to empty PEGDA microparticles (938 μm [CV: 8.4%] for PEGDA with islets and 904 μm [CV: 15.7%] for empty PEGDA microparticles).

Diffusion Characteristics of Microparticles

Figure 7:
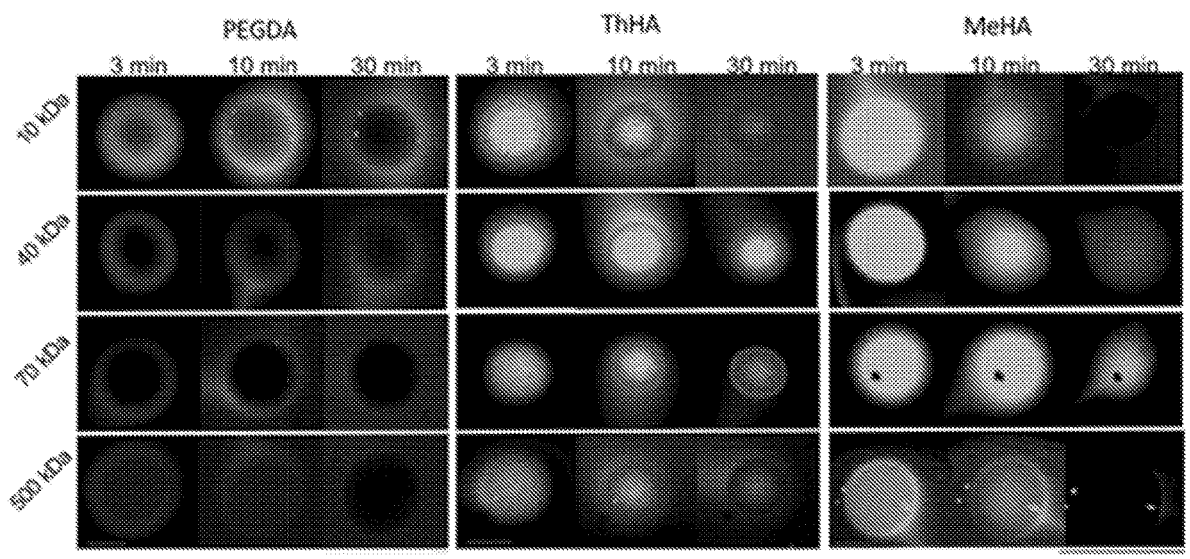
FIG. 7 shows images from the diffusion of fluorescently labeled dextrans into PEGDA, ThHA, and MeHA hydrogel microparticles.

FIG. 7 illustrates the diffusion of fluorescently labeled dextrans into the PEGDA, ThHA, and MeHA hydrogel microparticles. Microparticles were incubated overnight in fluorescent dextrans of various molecular weights, rinsed, and immediately examined by confocal microscopy to evaluate the extent of dextran penetration and rate of efflux as a measure of diffusion properties. The 10 kDa probe was able to penetrate all microparticles. However, fluorescence was weaker in the PEGDA microparticles, specifically near the center of the construct, suggesting a lower penetration rate of the probe compared to the HA microparticles, which both displayed strong fluorescence. Furthermore, fluorescence of the 10 kDa probe diminished rapidly in the HA groups, and was absent or nearly absent 30 minutes after rinsing. In contrast, localized fluorescence was still observable in the PEGDA group at 30 minutes, again suggesting a higher diffusion barrier to the 10 kDa probe compared to both HA gels.

Low level fluorescence from the 40 kDa probe was detected in the periphery of the PEGDA microparticles, but little to no signal was observed at the center, indicating a diffusion barrier to the probe (FIG. 7). The larger dextrans (70 and 500 kDa) showed little to no fluorescence signal in the PEGDA microparticles, suggesting that penetration of these probes into the gel matrix was negligible during the overnight incubation period.

Both ThHA and MeHA microparticles displayed strong fluorescence from all probes evaluated, suggesting minimal diffusion barrier even to large molecules. Furthermore, relative fluorescence signal in MeHA appeared noticeably higher compared to ThHA for all probes immediately after rinsing, suggesting a higher concentration of the probe, and thus an even lower diffusion barrier. This can be best exemplified by the 70 kDa probe, which had modest infusion into the ThHA microparticles, but appeared saturated in the MeHA microparticles. All additional studies focused on the hydrogel formulation with the greatest and least diffusion barriers, PEGDA and MeHA, respectively.

Discussion

We have developed and evaluated a new method for fabricating hydrogel microparticles for cell encapsulation and delivery. Current methods for cell microencapsulation are predominantly based on alginate spheres because of the quick gelation rate. Other hydrogels utilized for microencapsulation involve harsh oil-emulsion techniques. Instead, the CSS method could be used for a wide variety of hydrogel materials and is compatible with standard, commercially available and GMP-ready equipment and is minimally cytotoxic to islets.

Low cytotoxicity is a critical feature for cell encapsulation strategies. Thus, we evaluated some of the key enabling components of the CSS method, specifically calcium content and UV exposure, for cytotoxic effects to islets. Not surprisingly, 200 mM calcium was rapidly cytotoxic. However, we found that islets tolerated 100 mM calcium even in a highly concentrated and viscous PEGDA solution for at least 10 minutes. Exposure to 40 mW/cm² long-wave (~365 nm) UV light was minimally cytotoxic to canine islets for up to 10 minutes. Unexpectedly, the group without photoinitiator displayed the most cell death after UV exposure, which is in contrast to other similar studies. However, these other studies utilized a much lower UV intensity, between 4-10 mW/cm², and the photoinitiator concentrations used herein were comparatively low. Thus, it is possible that, in our experiments, the photoinitiator provided a protective effect, perhaps via preferential absorption of UV photons. Nevertheless, a concentration dependent increase in cytotoxicity was still observed in the groups containing IRGACURE® 2959, which is in agreement with previously published work.

The microparticles were significantly different in size, with MeHA beads nearly twice the diameter of ThHA beads, corresponding to a roughly 8-fold difference in total volume per microparticle, despite being fabricated using the same 400-micron nozzle system. The difference in size between the groups was most likely a result of differences in post-fabrication volumetric swelling dynamics. Hydrogel swelling is governed by a number of variables, but is strongly correlated to initial (i.e. pre-crosslinked) concentration of polymer and the density of crosslinks within the gel after fabrication. More specifically, solvent molecules (e.g. water) adsorbed to the gel polymer matrix exert outward pressure, causing the gel to expand (swell), whereas crosslinks in the gel matrix resist outward expansion. For example, a hydrogel with high initial polymer concentration and a low crosslink density would be expected to expand significantly in volume after fabrication. Conversely, gels with a high ratio of crosslinks to polymer concentration tend to resist expansion after fabrication. In our study, the smaller final size of the ThHA microparticles was probably a result of a low initial polymer fraction (1.2%) coupled with relatively high cross-link density. It is important to note that post-fabrication volumetric swelling should not be conflated with the swelling ratio "Q" (hydrated mass/dry mass). Specifically, Q describes the final gel structure after volumetric swelling has reached equilibrium, where a lower Q value generally indicates a stronger and more compact gel. Thus, is it possible for a gel to experience significant volumetric swelling, but still have a relatively low Q value, which appears to be the case for the PEGDA microparticles in this study. In contrast, ThHA microparticles experienced relatively little (if any) volumetric swelling but had a higher Q value compared to PEGDA microparticles. Furthermore, MeHA microparticles, despite having a low initial polymer concentration (3.5%), swelled significantly and had a high Q value, indicating a very low relative crosslink density.

Diffusion properties were considerably different between the microparticles groups. ThHA and MeHA microparticles were more permeable to dextran probes up to 500 kDa in size, with MeHA microparticles appearing to have the highest diffusivity of all three groups. Conversely, PEGDA particles appeared to strongly limit diffusion of dextrans of MW 40 kDa and larger. Though a wide array of factors can affect diffusivity of a gel, the swelling ratio "Q" (the ratio of the equilibrium hydrated mass to the dry mass of the gel) is strongly correlated to the permeability of the hydrogel. The PEGDA, ThHA, and MeHA microparticles had Q values of 17.3, 27.7, and 105.7, respectively. Thus, the diffusion behavior of the dextran probes observed in the microparticles is consistent with their corresponding Q values and with the measured surface pore sizes.

Example 2

Stability of Durable and Quick-Degrading Hydrogel Microparticles Final Product Introduction The description of durable versus a quick-degrading hydrogel microparticle is dependent on the stability of the physical composition of the microparticles. Both in vitro and in vivo stability studies were conducted to determine whether there was a difference between three formulations (PEGDA, MeHA, and AHA). While the CSS process provides for detailed tuning of the hydrogels to degrade at different rates, the following provides an example of two durable hydrogels, which could last months to years versus a more quickly degrading hydrogel.

Methods

In Vitro Durability Testing

For MeHA, PEGDA, and AHA, 1.000 gram of hydrated microparticles were collected then placed in a degradation buffer consisting of 10 mM HEPES buffered phosphate buffered saline with 1% gentamycin. The degradation solution was maintained at pH 7.3+/−0.10. Microparticles in solution were stored at 37° C. for 1, 3, and 6 weeks, then collected and dried at 60° C. overnight to obtain dry mass after degradation. The dry mass after degradation was compared to the dry mass of microparticles at day 0 to determine percent mass loss. Additionally, the swelling ratio was measured at each time point to assess gel strength alongside degradation.

In Vivo Durability Testing

Canine Islet Isolation

Canine islets were isolated from pancreas obtained locally from euthanized donors from local veterinary clinics with consent by owners for organ donation. The procurement and digestion protocol have been published previously in detail. Following removal and cleaning of the organ, collagenase digestion followed by density gradient purification was performed using standard published protocols. Isolated islets were converted to islet equivalents, or "IEQ", for quantification purposes via dithizone staining according to standard published protocols. Canine islets were cultured in CMRL 1066 supplemented with 10% fetal bovine serum, 2 mM glutamine, 10 mM nicotinamide and a 1% antibiotic-antimycotic solution at 37° C. and 5% $CO_2$.

Encapsulated Islet Xenotransplants

Immunodeficient NOD/SCID mice (NOD.CB17-Prkdc$^{scid}$, Jackson Laboratory) treated with streptozotocin (STZ, 220-250 mg/kg) to induce diabetes, were used to evaluate the functional capacity of canine islets encapsulated via CSS. Six mice received islets encapsulated in PEGDA, two mice received islets in PEGMAL (synthesis procedures below), and 4 mice received the same dose of islets encapsulated in MeHA. Two mice were transplanted (IP) with an equivalent dose of un-encapsulated islets as controls. At 10 weeks into the study all the mice receiving MeHA encapsulated islets were hyperglycemic and were terminated, along with the un-encapsulated islet group. Four mice from the PEGDA group were also terminated at 10 weeks to serve as comparisons for subsequent histology studies. The two remaining PEGDA mice were terminated after another 6 weeks. Monitoring of the two PEGMAL mice is ongoing (more than 16 weeks from transplantation).

The durable PEGDA and quick-degrading MeHA formulations of islet encapsulated microparticles were fabricated as described above with the exception that canine islet cells were mixed into the precursor. The durable PEGMAL formulation, which is chemically crosslinked (i.e., non-UV), was prepared following a similar scheme as the ThHA microparticles described above. Briefly, a hydrogel precursor composed of 25% (w/w) 8-arm 40 kDa PEGMAL (JenKemUSA) and canine islets was extruded into a pH 6.6 alginate bath containing a 1 kDa SH-PEG-SH crosslinker at a concentration of 0.25% (m/v) (BiochemPEG), and stirred for 5 minutes. After 5 minutes, the crosslinking alginate bath was then diluted by half with HEPES buffered islet medium to a final pH of ~7.2 and stirred for an additional 30 minutes to allow complete crosslinking of the hydrogel core. Alginate shells were them removed as described.

Islet-containing microparticles were administered via an 18 G catheter into the intraperitoneal (IP) space of the mice. The islet dose was based on previous escalating-dose studies, demonstrating that approximately 4000 islet equivalents per mouse resulted in normoglycemia, and is consistent with previous publications of canine islets transplanted into mice. Blood glucose levels were measured daily for 14 days following transplant for all mice, and biweekly after that.

Upon termination of the animals (10 and 16 weeks), islet-containing microparticles were recovered from the IP space and placed in culture medium for evaluation. Islet-containing microparticles were stained with dithizone to detect the presence of insulin, as well as with calcein (live cells) and propidium iodide (apoptotic/necrotic cells) to evaluate cell viability of the explanted tissues. Color, bright field and fluorescent images of the stained microparticles were captured using a Cytation 5 Imaging Multi-Mode Reader (Biotek Instruments, Inc.).

The pancreas and tissue samples from the peritoneum with attached microparticles were removed and fixed overnight in 10% neutral buffered formalin before transferring to PBS. Tissues were embedded in paraffin blocks and appropriately sectioned for staining. For hematoxylin/eosin (H&E) staining, sections were serially deparaffinized by placing in Clear Rite3 solutions 3 times for 3 minutes each followed by subsequent dehydration and rehydration steps prior to staining with hematoxylin and eosin. Sections were rinsed in water followed by application of Bluing Reagent with further tap water rinses. Sections were finally immersed in 100% anhydrous alcohol and Clear Rite 3 to improve color stability and cover slips applied accordingly. Slides were examined and images captured on a BioTek Cytation 5 Cell Imaging Multi-Mode Reader.

Encapsulated Islet Allogeneic Transplants

Two adult male dogs recently diagnosed with diabetes were given canine islet transplants encapsulated with either durable PEDGA or quick-degrading MeHA (N=1/group). The encapsulation of the canine islets followed the protocol described previously. Each dog received transplants consisting of approximately 60 mL of packed microparticles delivered to the peritoneum via catheter direct infusion. The dogs were monitored for body weight and blood glucose daily for the first 20 days after the transplants.

Results

In Vitro Degradation

Figure 8A:
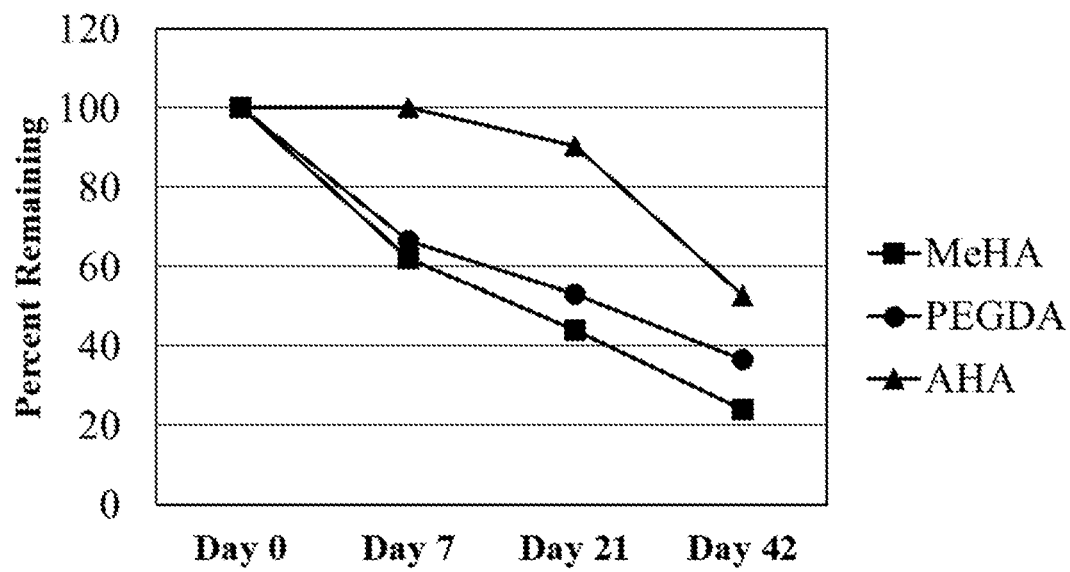
FIG. 8A is a graph of the degradation of different particles based upon remaining microparticle polymer mass over time.
Figure 8B:
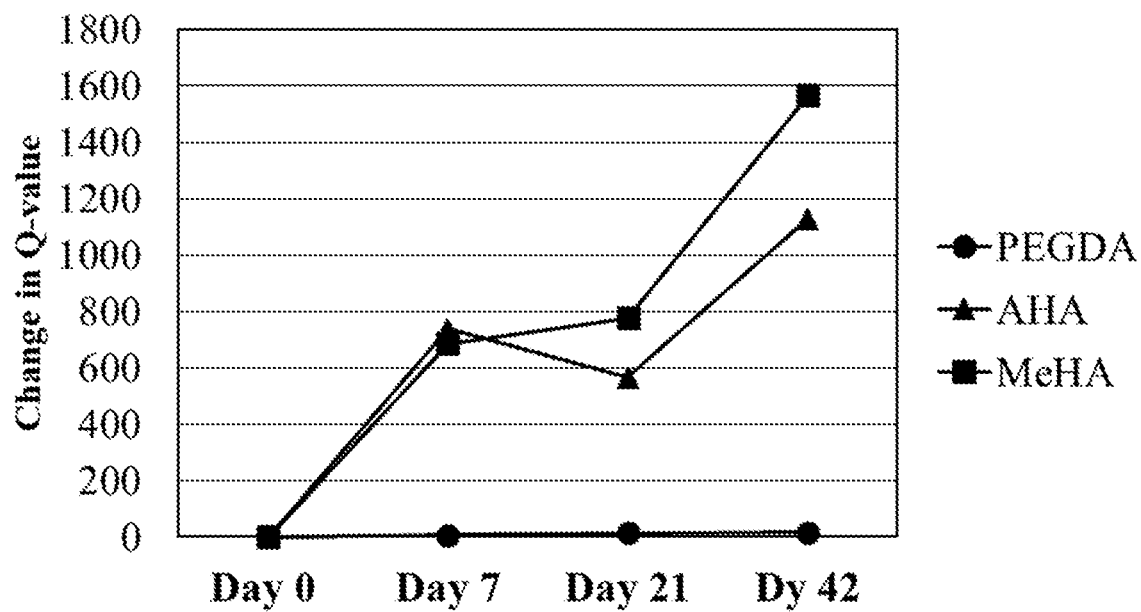
FIG. 8B is a graph of the change in Q-value (swelling ratio) for the different particles over time.
Figure 8C:
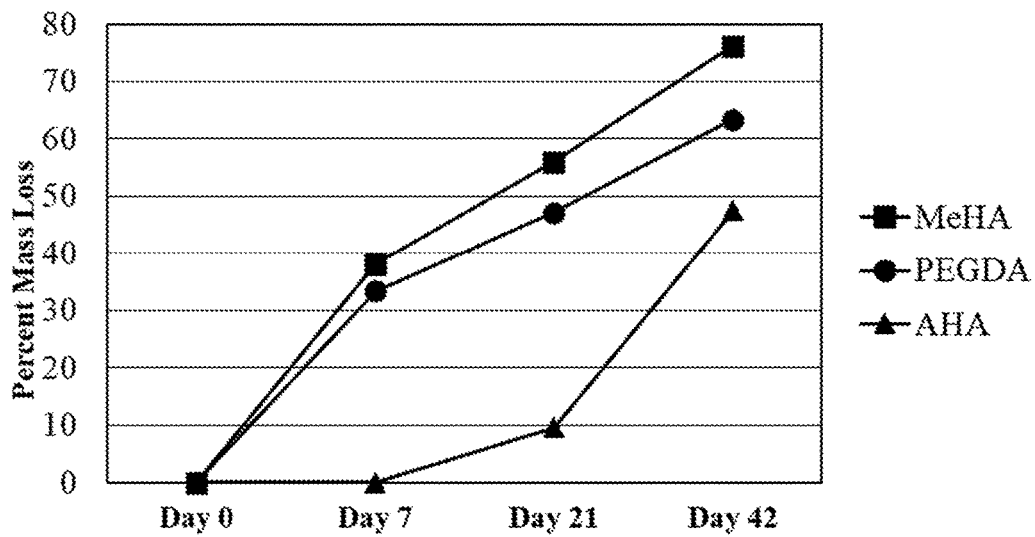
FIG. 8C is a graph of the degradation of different particles based upon loss of particle mass over time.

MeHA, PEGDA, and AHA microparticles were placed in a HEPES buffered degradation solution at 37° C. for 1, 3, or 6 weeks then dried to determine the dry polymer mass. After 6 weeks of degradation it was found that MeHA microparticles retained only 24% of their starting mass, whereas PEGDA and AHA retained 37% and 53%, respectively (FIG. 8A). While PEGDA lost a significant amount of mass (FIG. 8C), it maintained gel strength during the 6 weeks as noted by no change in the swelling ratio (FIG. 8B). In contrast, MeHA and AHA microparticles showed drastic increases in their swelling ratios, indicating a significant decrease in gel strength as the microparticles degrade. The variation in gel strength between PEGDA and HA-based microparticles can likely be attributed to both the crosslinking density and the polymer chemistry. For PEGDA microparticles, polymer chains are held tightly together through several covalent bonds at a higher crosslink density relative to HA microparticles. Additionally, PEGDA polymer chains contain some regions of hydrophobic moieties. Both the crosslinking density and hydrophobic regions make the rate of diffusion of water into the microparticles slower than the rate of hydrolytic degradation occurring on the surface of the microparticles. Naturally, if degradation is only occurring on the surface, the interior gel network remains intact and gel strength is preserved. In MeHA and AHA microparticles, however, the crosslinking density is much lower, and the polymer chemistry results in a more hydrophilic structure relative to PEGDA. Both the lower crosslink density and hydrophilicity of HA microparticles facilitate a higher diffusion rate of water into the microparticles, resulting in a bulk degradation mechanism. In bulk degradation, water penetrates deep into the hydrogel network and results in hydrolytic degradation that compromises the integrity of a gel network. This type of degradation may explain why AHA microparticles have a higher polymer mass than PEGDA remaining after 6 weeks of degradation. The loss of gel strength over time in HA microparticles indicates that hydrolytic degradation is occurring, but that the degradation products have not diffused out of the gel network yet. In this case, polymer mass remaining would not be an accurate evaluation of the extent of degradation because although the polymer is inside the gel network, it's no longer contributing to hydrogel integrity.

Function of Canine Islet-Loaded Microparticles in Diabetic Mice

Figure 9:
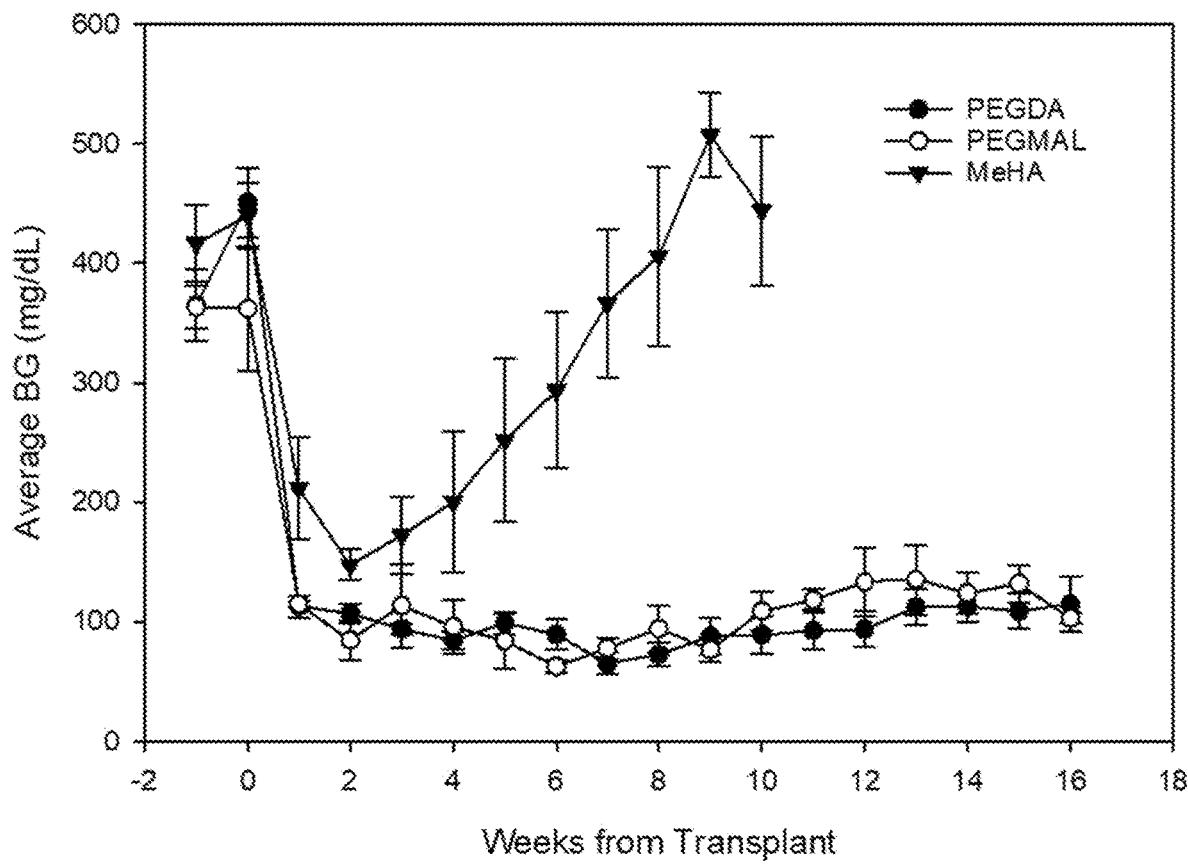
FIG. 9 is a graph of the mean daily blood glucose levels for each group during the initial study cohort following transplant in mice.

Canine islets encapsulated in PEGDA or MeHA were transplanted into diabetic NOD/SCID mice. A control group received un-encapsulated islets. FIG. 9 shows the mean daily blood glucose levels for each group during the initial study cohort following transplant. All mice in the MeHA, PEGMAL, and PEGDA groups were normoglycemic by the second week following transplantation. However, the animals receiving quick-degrading MeHA microparticles gradually returned to hyperglycemic levels (starting approximately 3-weeks post-transplant), despite re-introduction of exogenous insulin therapy. These mice were euthanized at approximately 10-11 weeks. Mice receiving durable PEGDA- and PEGMAL-encapsulated islets remained normoglycemic throughout the study period (PEGMAL ongoing, 16 weeks) with excellent glycemic control without exogenous insulin.

In contrast, all mice that received un-encapsulated islets failed to achieve persistent normoglycemia for any timepoint. These mice had an initial mean blood glucose of 386±23 mg/dL prior to the transplant, and on the day of transplant blood glucose was 494±61 mg/dL. Following transplants of the same volume of islets as the other two groups, the blood glucose had only one normal reading on day 2 for one of the animals, while the other mouse demonstrated fluctuating blood glucose values from days 19-30, but then reverted to consistently hyperglycemic levels for the remainder of the study.

Figure 10:
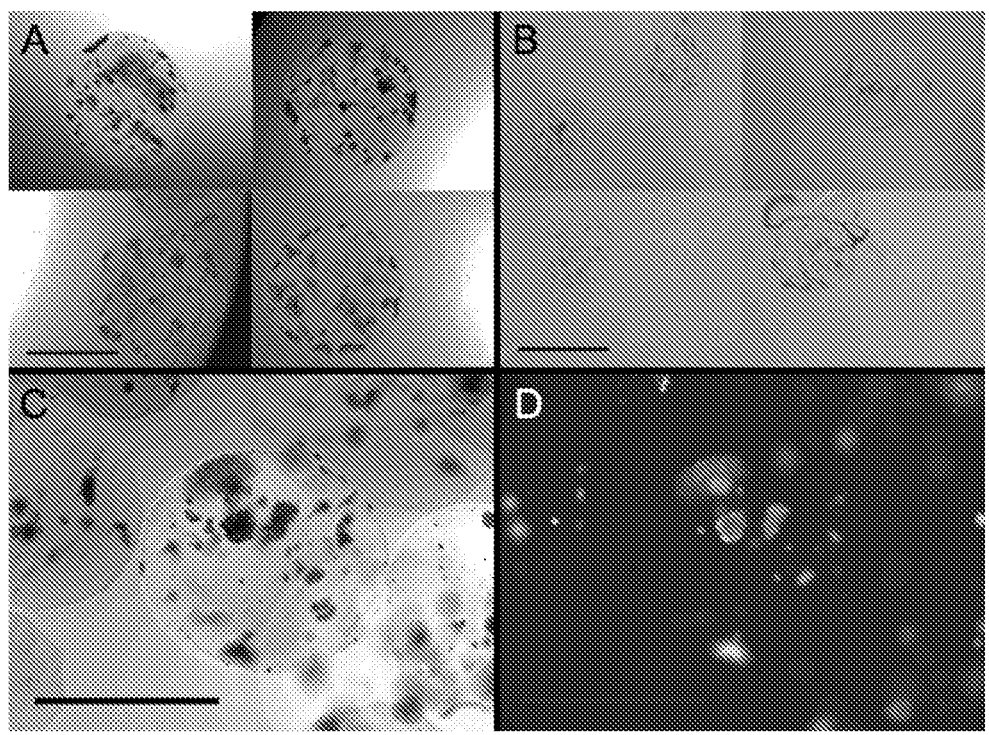
FIG. 10 shows images from recovery of microparticles from the IP space in mice for (A) PEDGA, (B) MeHA, (C) PEDGA, with viability as indicated by deep red dithizone staining, and (D) PEDGA viability as indicated by co-staining with deep red dithizone and green calcein.

Upon necropsy, microparticles were recovered from the IP space of the mice. The results are shown in FIGS. 10A-D. Islet-containing durable PEGDA microparticles were easily retrieved at approximately 10 weeks, but the quick-degrading MeHA microparticles were few in number and difficult to identify. Samples of the retrieved PEGDA microparticles were found randomly dispersed throughout the IP cavity and remained clear and structurally intact. The retrieved PEDGA microparticles showed little to no indication of degradation (i.e. smooth edges, no apparent change in size, mechanically stable), and the transplanted cells were still contained within the microparticles (FIG. 10A). In contrast, the quick-degrading MeHA microparticles were misshaped and smaller in diameter, indicative of significant hydrogel degradation. The MeHA microparticles did not appear to contain intact islets (FIG. 10B). At the later time point (16 weeks) the durable PEDGA microparticles continued to be easily retrievable at necropsy. The islets within the PEGDA microparticles were stained with dithizone, calcein, and propidium iodide (PI) to confirm the presence of live, functional islets.

PEGDA microparticles retrieved at approximately 16 weeks following the transplant contained healthy, viable islets identified by deep red dithizone staining (FIG. 10C). The same islet was co-labeled with green calcein, a common indicator for live cells (FIG. 10D). Some positive PI staining (red; apoptotic/necrotic cells) was observed but was generally localized to non-islet (i.e. dithizone-negative) tissue that appeared to be adhered to the surface of the recovered microparticles. Conversely, islets (dithizone-positive cells) were almost completely devoid of PI (dead cell) staining (FIG. 10D).

Figure 11:
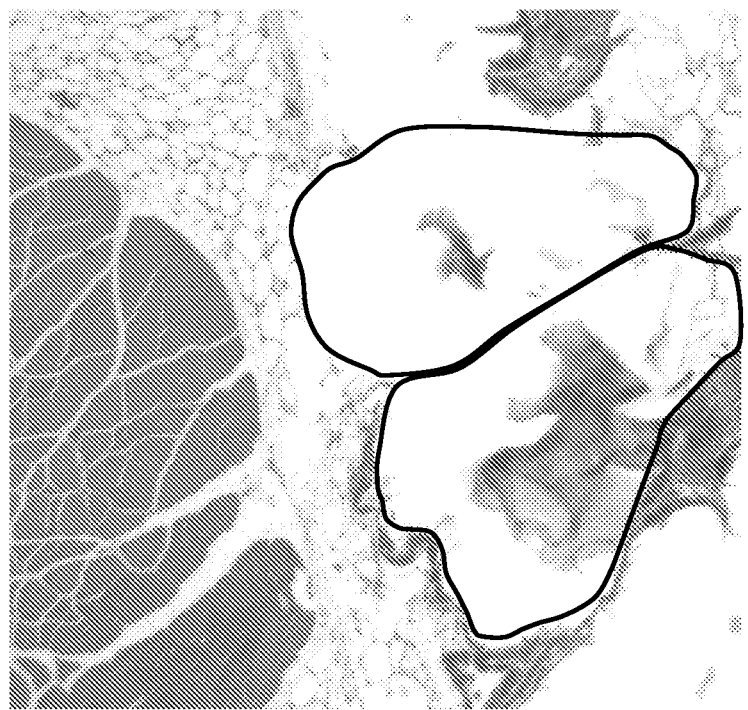
FIG. 11 shows an image of healthy adipocytes demonstrating lack of fibrotic tissue after implantation with the PEGDA microparticles.

Durable PEGDA microparticles were found attached to tissues such as the liver and abdominal wall but were generally unattached and free floating in the cavity. Histology of the graft site identified the location of the PEGDA microparticles. While the method of processing for histology destroyed the integrity of the PEGDA microparticles, the attachment sites were free of obvious fibrotic tissue. FIG. 11 illustrates healthy adipocytes at the intersection with two microparticles with the location of the microparticles denoted by the dark line. The bluish gray-colored film in the center of each microparticles location is the remaining hydrogel following processing. In contrast, no gel material could be identified in histology sections from the MeHA group. For the PEGDA group there was a general lack of fibrosis at the microparticle-omentum interface. To ensure that the normalized blood glucose values in the PEGDA-treated mice was due to the graft transplant, rather than endogenous islets remaining within the pancreas after the streptozotocin treatment, histological sections of the pancreas were examined for the presence of islets. Only one islet-like structure was identified in six pancreatic sections per mouse (results not shown).

Figure 12:
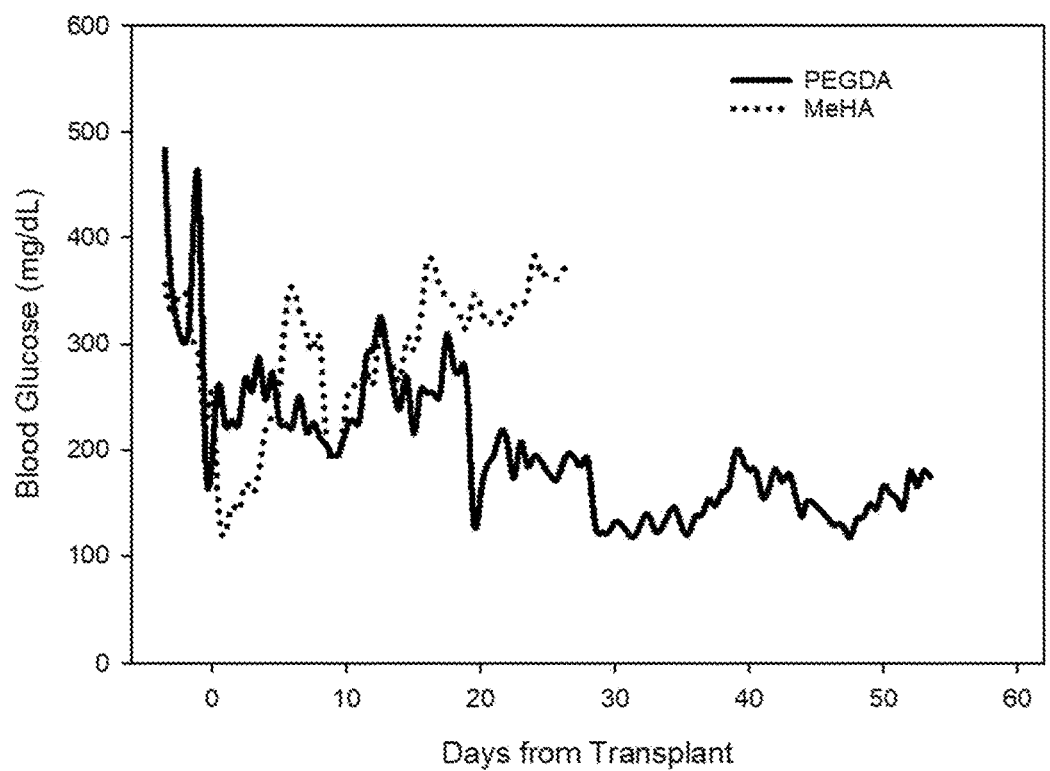
FIG. 12 is a graph of the mean, non-fasting blood glucose from measurements obtained in the morning and afternoon of each day in the dogs.

A similar study was completed using canine islets transplanted into two diabetic dogs. The animals were both diabetic prior to the transplant and did not receive exogenous insulin on a regular basis. One dog received canine islets encapsulated in durable PEGDA microparticles, while the other received canine islets encapsulated in the degradable MeHA hydrogel. FIG. 12 shows the mean, non-fasting blood glucose from measurements obtained in the morning and afternoon of each day. The dog receiving the islets in the durable hydrogel slowly returned to a lower blood glucose level (solid line), within the normal range and maintained that normal level for the duration of the experiment (8 weeks). In contrast, the animal receiving the quick-degrading hydrogel slowly returned to a fully-diabetic state within 20 days after the transplant (dotted line).

Discussion

Interestingly, while both mouse groups achieved normoglycemia after IP injection of the microparticles, un-encapsulated islets at the same dose and transplant site did not achieve normoglycemia. Because the animal model included an immune-compromised mouse, the result suggests that the hydrogel matrices provide a physically supportive environment that facilitate better cell function and survival, particularly in the context of transplantation via injection into the IP cavity. This conclusion is further corroborated by the observation of degradation of the MeHA microparticles over time with concurrent reversion to hyperglycemia. Of further note, the PEGDA- and PEGMAL-islet microparticles, which were more structurally robust, led to superior control of blood glucose levels compared to MeHA transplants in the peri-transplant period, prior to the recurrence of hyperglycemia in the MeHA group.

Although the study in dogs only included two animals, the results are important because they contrast the differences in response in immune-compromised mice versus immune-competent dogs. With an intact canine immune system, the weaker hydrogel (MeHA) was degraded more quickly resulting in a faster return to hyperglycemic blood glucose levels. The results do show that this specific formulation of the degradable hydrogel microparticles has an in vivo duration of approximately days to weeks, depending on the species. However, the durable hydrogel microparticle demonstrated an in vivo duration of at least 2 months.

Example 3

In-Bead Proliferation of Durable Versus Quick-Degrading Microparticle End Products Introduction The manipulation of the physical and chemical properties of cell encapsulants has become a powerful tool for tissue engineering research in vitro. It is known that the mechanical and chemical properties of the microenvironment alter the behavior of a variety of cell types, but most notably stem cells are influenced by the mechanical properties surrounding the cells. The ability of stem cells to continue to proliferate within a hydrogel is an important characteristic for therapeutic treatment of soft tissue defects due to trauma or secondary to surgical interventions. For example, muscle or skin trauma would benefit from locally delivered microbeads with proliferating stem cells. This would result in a smaller dose of microparticles, because the cell numbers would continue to increase while in the microparticle. However, not all hydrogels allow cells to proliferate within the microparticle. Here we show that the quick-degrading hydrogel microparticle allows robust cell proliferation within the microparticle.

Methods

Human embryonic kidney cells (HEK293) were cultured in DMEM media with high glucose and fetal bovine serum and maintained at 37° C. with 5% $CO_2$ in an incubator. When cells reached the appropriate density, they were detached from the culture flask by adding 0.5% trypsin-EDTA for 2 minutes. Once detached, cells were transferred to growth medium. To test the ability of cells to proliferate within the hydrogels, two types of hydrogel polymers, quick-degrading MeHA and durable PEGDA, were fabricated into microparticles using the CSS manufacturing process described above. The same amount of polymer precursor (1 mL) was mixed with the same number of proliferating human embryonic kidney cells (HEK293; 4 million cells), followed by microparticle formation using the methods described previously. The microparticles were kept under culture conditions for 3 weeks. To assess the proliferation of cells within the microparticles, images were captured over 34 days using the BioTek Cytation 5 Cell Imaging Multi-Mode Reader.

Results

Figure 13:
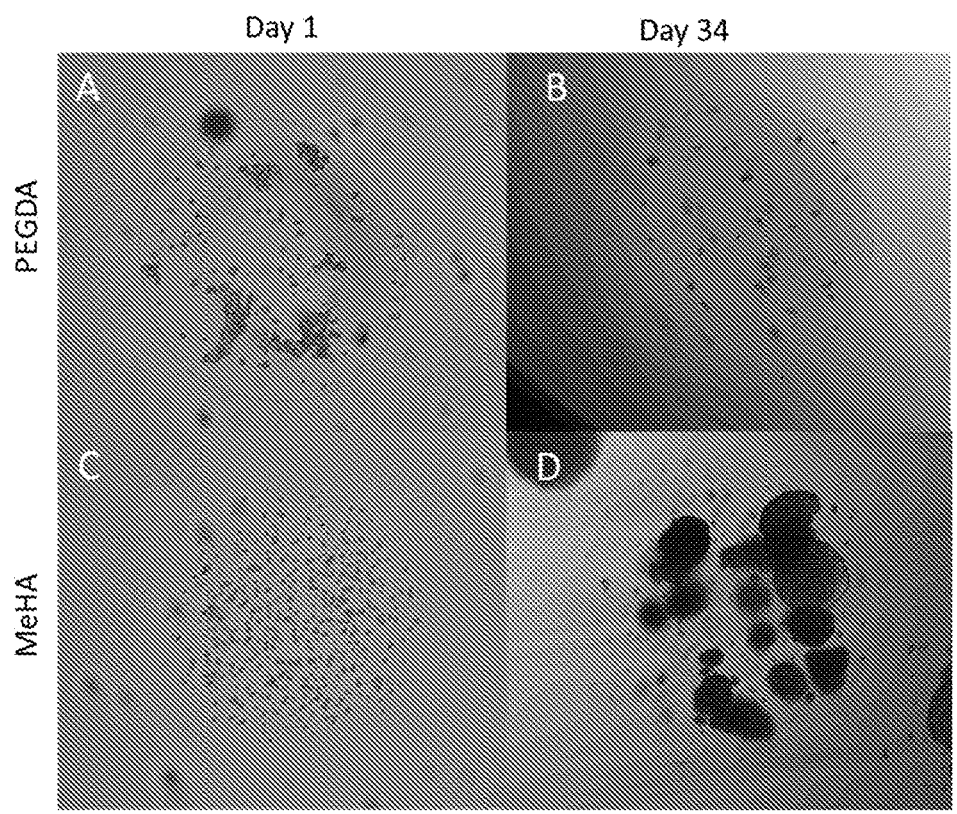
FIG. 13 shows images of (A) HEK293 cells clustered together in durable PEGDA microparticles, (B) little change morphology or number of cells from (A) in the PEGDA microparticles 34 days later, (C) dispersed HEK293 cells in degradable MeHA microparticles, and (D) proliferation of cells from (C) in the MeHA microparticles 34 days later.

At the time of formulation of the microparticles, it was noted that the cellular morphology and its distribution within the microparticles was unique, depending on the hydrogel. Initially, the HEK293 cells clustered together in the durable PEGDA microparticles (FIG. 13A). In contrast, the same cells loaded at the same density remained as single cells in the degradable (MeHA) microparticles (FIG. 13C).

Over time, there was little change in the morphology or number of cells in the PEGDA microparticles (FIG. 13B). In contrast, the cells in the degradable MeHA microparticles proliferated within the hydrogel creating large clusters within the microparticles as can be seen after 34 days in culture (FIG. 13D). The clusters did not appear to protrude from or attach to the surface of the MeHA beads, but remained encapsulated in the bead matrix. However, the same cells within the durable PEGDA microparticles did not rapidly proliferate or form proliferating cell clusters inside of the PEGDA beads.

Discussion

The microparticles in their final product form either block or allow proliferation of the cells within the microparticles. With the data presented here, we show that the durable hydrogel blocked cell proliferation, while the softer quick-degrading MeHA hydrogel allowed significant proliferation of the embryonic cells. In addition, the morphology of the cells was altered, based on the formulation utilized. This may be important when encapsulating proliferating versus non-proliferating cells, and it can be tuned using the CSS technique.

Example 4

Cell Migration in Durable Versus Degradable Microparticle End Product

Introduction

In some therapeutic cases, migration of the cells or their products out the microparticles is an important aspect of the therapy. For example, endogenous stem cells or progenitor cells have been shown to migrate to the brain during normal development and also under pathological conditions, such as a brain injury or disease. Some research has suggested that native stem cells actually migrate or "hone" to an area of injury to aid in its repair. However, most research has failed to substantiate such a claim when controls are in place measuring the number of stem cells in the non-injured tissue.

Thus, in order for cells to aid in the repair of any tissue, they must be localized to the area for extended periods of time. The therapeutic practice of placing unencapsulated stem cells in a region is fraught with challenges, because cells are small and they will quickly diffuse out of the area or be attacked by the immune system. Thus, a localized approach that allows the controlled release of cells to a specific area would be of great therapeutic benefit. Here we demonstrate those properties in the degradable microparticle.

Methods

Three types of hydrogel polymers, MeHA, AHA, and PEGDA, were fabricated into microparticles using the CSS manufacturing process described above. Human embryonic kidney cells (HEK293) were cultured in DMEM media with high glucose and fetal bovine serum and maintained at 37° C. with 5% $CO_2$ in an incubator. Rat bone marrow stem cells (rBMSC's) were cultured in high glucose DMEM, fetal bovine serum, and Glutagro. When cells reached the appropriate density, they are detached from the culture flask by adding 0.5% trypsin-EDTA for 2 minutes. Once detached, cells were transferred to growth medium. The same amount of polymer precursor (1 mL) was mixed with the same number of HEK293 cells or rBMSC's (4 million), followed by bead formation.

To assess the amount of cellular migration out of the microparticles, at defined time points the microparticles were removed from the medium and washed over a screen. The washing medium and the medium around the microparticles was collected. Cells were counted using both the Cytation 5 Imaging Multi-Mode Reader (Biotek Instruments, Inc.) and the EVE Cell Counter.

Results

Figure 14:
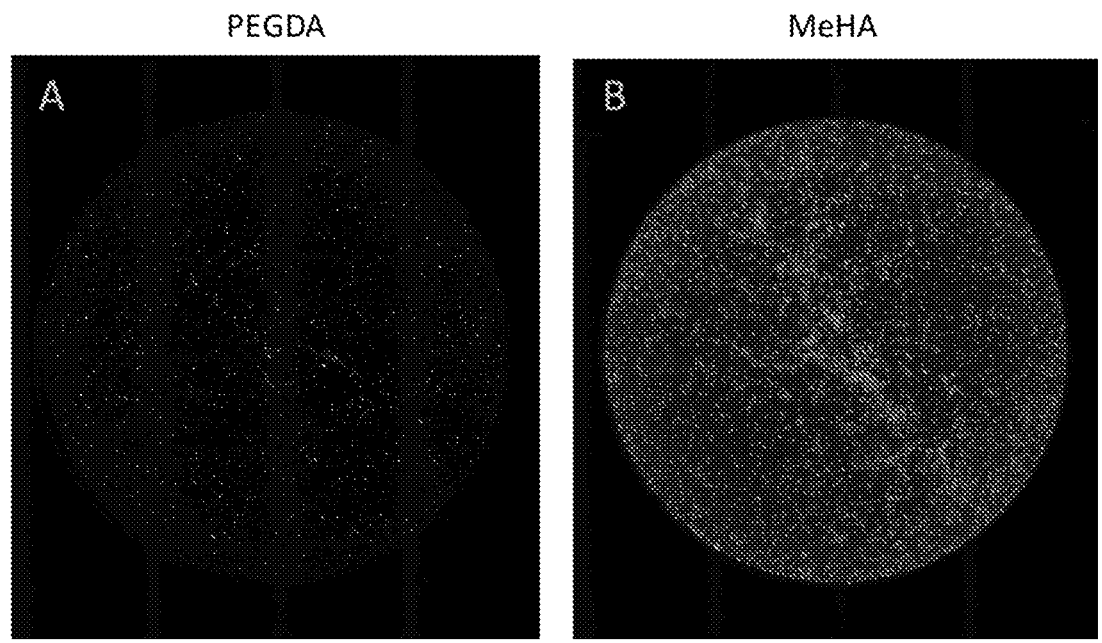
FIG. 14 shows images from microplate wells with collected spent media showing (A) very few HEK293 cells diffused from the PEGDA microparticles, and (B) a high number of live cells diffused from the MeHA microparticles.

FIG. 14 provides typical images of the wells with the collected spent media along with the wash media with individual cells 4 days after encapsulation. Few cells were counted in the media of the HEK293 cells encapsulated in the PEGDA hydrogel, and many of them were dead (red) (FIG. 14A). In contrast, the degradable hydrogel allowed the release of high numbers of live cells, as shown by the high number of live cells (green) left behind in the well in FIG. 14B. Yet, these cell numbers were small compared to the accumulated cellular release in week 2.

Figure 15:
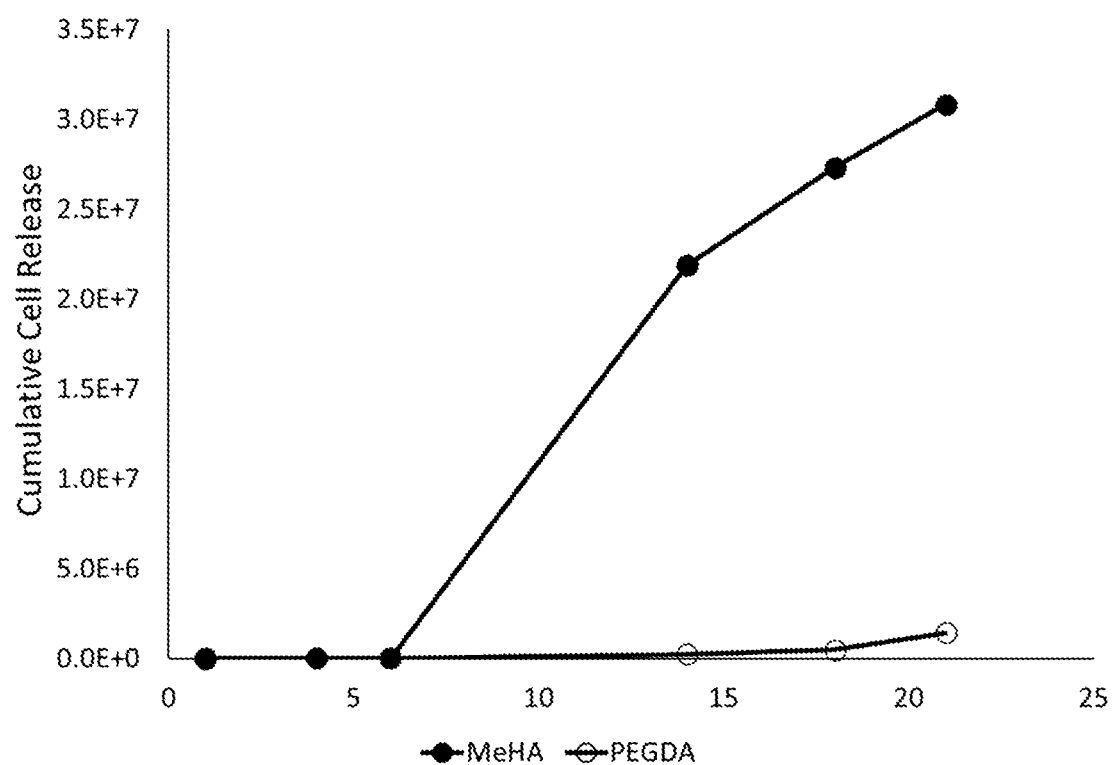
FIG. 15 is a graph summarizing the average data from the study on cumulative cell release.

FIG. 15 summarizes the average data from the study on cumulative cell release. During the first 6 days of culture, only a few thousand cells were released from the beads. By Day 14, more than 20 million cells were released by the quick-degrading MeHA microparticles while only 220,000 cells were released from the durable PEGDA beads. Cumulatively, by Day 21 the MeHA beads released 30.8 million cells, while PEGDA released less than 5% of that.

Discussion

From the results a clear difference is defined in the number of proliferating cells that migrate out of the durable versus degradable microparticles. The final microparticle product allows the migration of cells out of the microparticle to the surrounding tissues. The quick-degrading formulation does so in a quicker and larger fashion than the durable hydrogel. The results illustrate the utility of the quick-degrading hydrogel in allowing the migration of cells to a local site of injury, even before the physical degradation of the microparticles occurs.

Example 5

Viability, Morphology, and Function of a Durable Versus Quick-Degrading Microparticle End Product Introduction There are numerous applications for the durable or quick-degrading/short-term hydrogel formulations. It has been demonstrated in the literature that microencapsulated mesenchymal stem cells (MSCs) dramatically enhanced paracrine-mediated healing in a murine hind-limb injury model, showing increased survival and pro-angiogenic activity compared to un-encapsulated MSCs. Once encapsulated, the cells must maintain viability and must function therapeutically. It has been demonstrated that increasing the stiffness of the encapsulating matrix directed MSC differentiation toward a more osteogenic path versus a chondrogenic path with softer materials. Additionally, rat neuronal cells cultured in a 3D collagen hydrogel showed better survival and behaved more like native neuronal networks compared to cells grown in 2D on the same material.

Methods

Viability and Morphology

Two types of hydrogel polymers, quick-degrading (MeHA and AHA) and durable (PEGDA) were fabricated into microparticles using the CSS manufacturing process described above. The same amount of polymer precursor (1 mL) was mixed with the same number of either mouse MSCs (16 million) or insulinoma cells (30 million cells), followed by bead formation. The beads were kept under culture conditions for 2 weeks. Viability and function of the cells when cultured within the microparticles was high for each of the formulations. Once encapsulated, the viability of MSCs and insulinoma cells within the microparticles was measured using fluorescent viability stains. Calcein was added to the media as a measure of live cells, because calcein can only enter cells with intact membranes. Propidium iodide as added to the culture media to identify dead cells. After 30-60 minutes or incubation in the fluorophores, images of the microparticles were collected on a Cytation 5 Imaging Multi-Mode Reader (Biotek Instruments, Inc.).

Similar experiments were also carried out using a non-proliferative somatic cell source (canine islets) encapsulated in the two different hydrogels. Microparticles were fabricated as described above with the cells (islets or cultured cells) mixed into the precursor. For canine islets, a 1.1× concentration of the precursor was mixed with a slurry of canine islets at a 10:1 volume ratio just prior to droplet generation. Fabrication of islet-microparticles was done aseptically in a closed, sterile bioreactor system.

The completed microparticles were stained with dithizone to detect the presence of insulin, as well as with calcein (live cells) and propidium iodide (apoptotic/necrotic cells) to evaluate cell viability of the explanted tissues. Color, bright field, and fluorescent images of the stained microparticles were captured using a Cytation 5 Imaging Multi-Mode Reader (Biotek Instruments, Inc.).

Results

Figure 16:
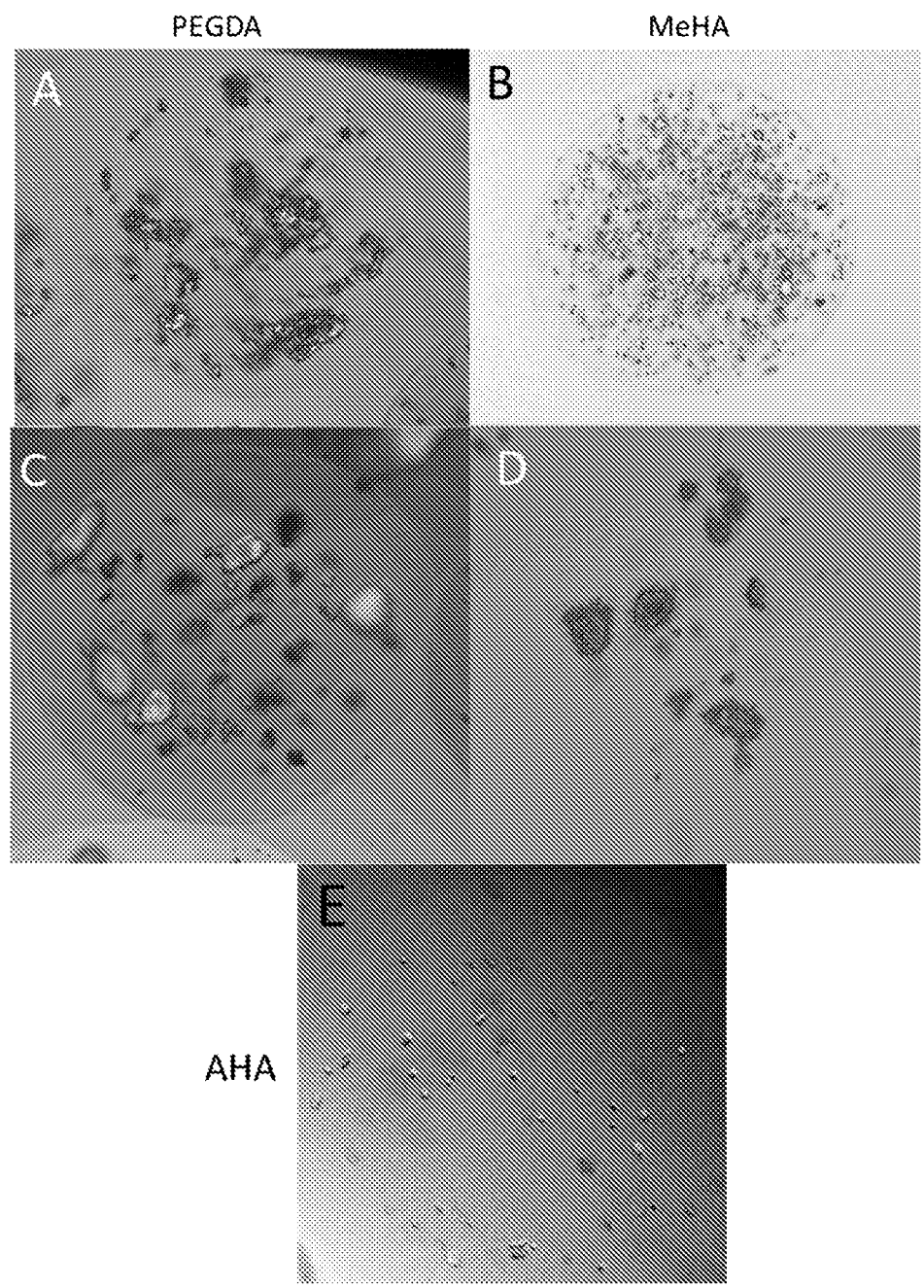
FIG. 16 shows images of (A) MSCs encapsulated in PEGDA microparticles, (B) MSCs encapsulated in MeHA microparticles, (C) Islets encapsulated in PEGDA microparticles, (D) Islets encapsulated in MeHA microparticles, and (E) MSCs encapsulated in AHA microparticles.

MSCs encapsulated in either PEGDA or MeHA showed high viability as shown in FIGS. 16A and B. Similar results were seen in AHA (FIG. 16E). The green fluorophore indicates live cells stained with calcein. The red/yellow cells designate dead cells stained with propidium iodide. Interestingly, the cells were loaded into the microparticles as single cells, but they quickly clustered together in the durable PEGDA gel, but not in the degradable MeHA hydrogel, where they stayed as mainly single cells. Monitoring of the morphology of the cells during the fabrication process indicated that the cells clustered during the microparticle fabrication rather than after fabrication.

In studies using canine islets, the cells had high viability in both hydrogel microparticles (FIGS. 16C—PEDGA and 16D—MeHA). They continued to function in either hydrogel as demonstrated by staining them for insulin content. Islets were loaded into the microparticles as clusters of cells. There did not appear to be any change in the clustering frequency or cluster size in either formulation.

Figure 17:
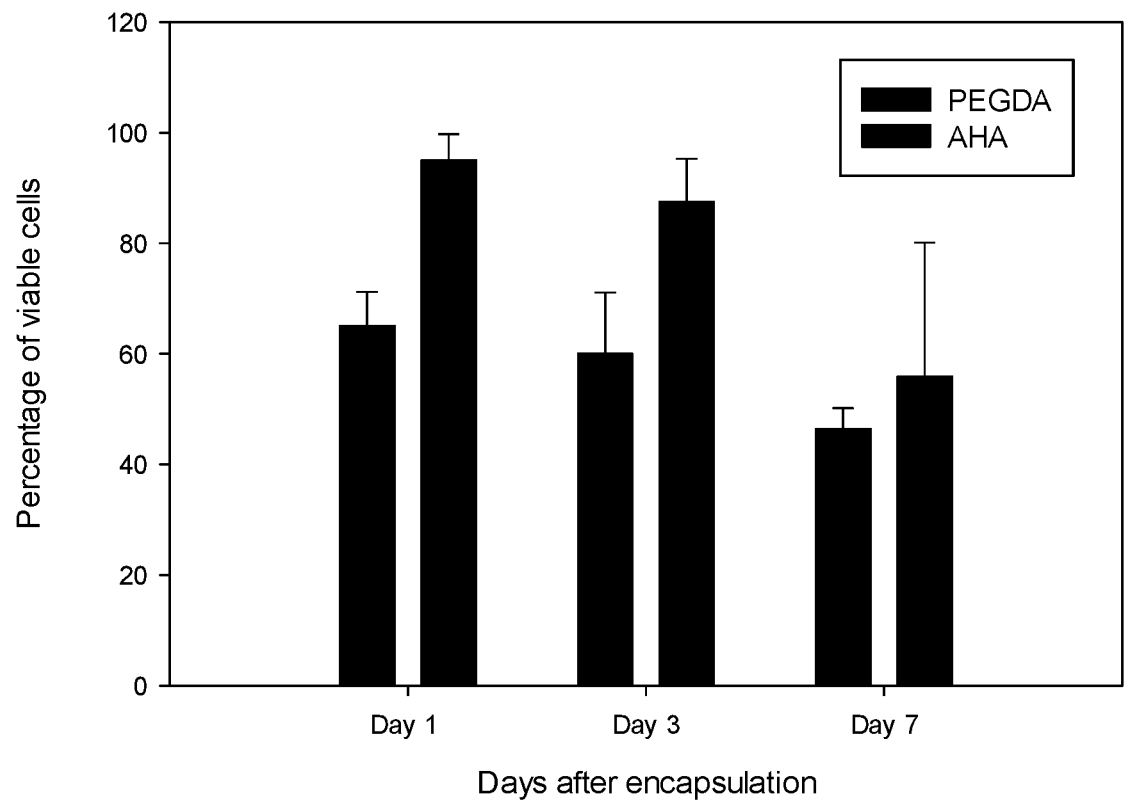
FIG. 17 is a graph of cell viability for a rat insulinoma cell line encapsulated in PEGDA and AHA microparticles.

Similar results were obtained using a rat insulinoma cell line. FIG. 17 shows the high viability of the cells, especially when encapsulated in AHA, within one day following encapsulation. Over the next 7 days, the viability of the cells in AHA dropped to approximately 50%. In contrast, the insulinoma cells in PEGDA started with a lower viability, but maintained close to that average value throughout the study.

Figure 18:
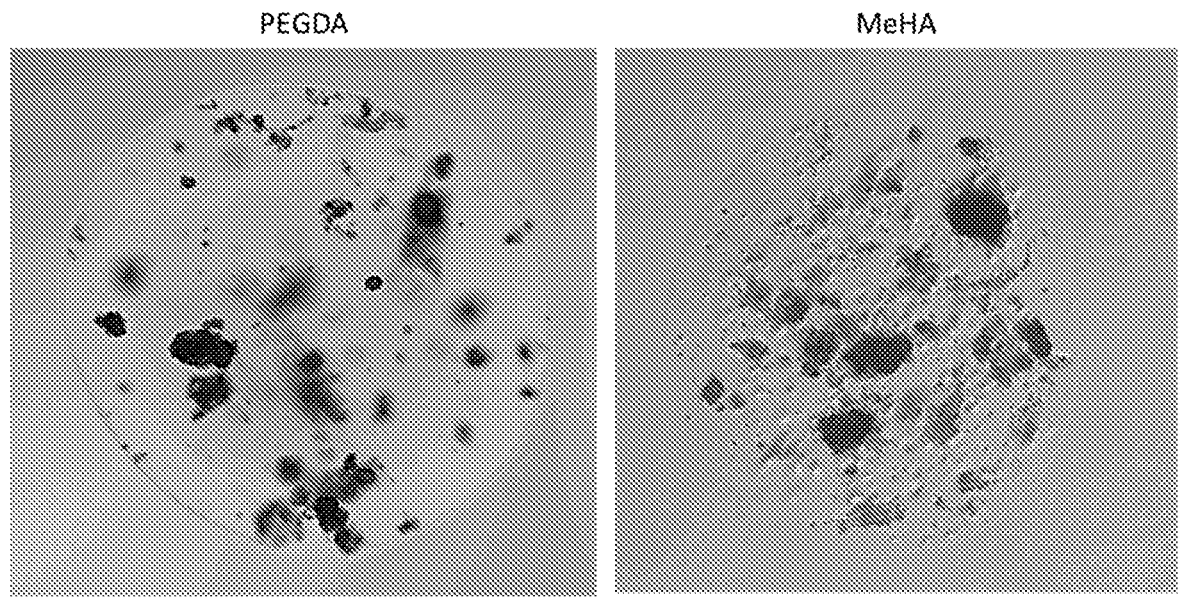
FIG. 18 shows images of islets encapsulated in either PEGDA or MeHA and stained with dithiozone to demonstrate functional islets that produce insulin.

Functional testing of the islet cells was conducted by staining for insulin within the cells. Dithizone staining is a standard indicator of insulin production. It stains the insulin-positive cells with a red/brownish hue. The images in FIG. 18 illustrate positive insulin staining of islets in both the durable PEGDA and degradable MeHA microparticles approximately 1 week after encapsulation, indicating their ability to continue to produce insulin after encapsulation in either microparticle. Unlike the mouse MSCs, the morphology of these somatic islet cells did not change appreciably in either hydrogel formulation.

Example 6

Localized Cellular Administration of Durable Versus Quick-Degrading Microparticle End Product Introduction There are numerous applications for the durable or quick-degrading hydrogel formulation. It has been demonstrated in the literature that microencapsulated MSCs dramatically enhanced paracrine-mediated healing in a murine hind-limb injury model, showing increased survival and pro-angiogenic activity compared to un-encapsulated MSCs. One of the problems with the use of MSC paracrine release is that unencapsulated MSCs do not stay in the area of injury and are quickly removed from the body. Thus, encapsulation using a sticky hydrogel will trap the cells in the area of implantation where they can secrete advantageous compounds. We conducted experiments to determine whether the durable or degradable formulation of the microparticles showed differences in their ability to stick to surrounding tissue and remain in the area.

Methods

Adherence to Tissue

Immediate tissue adherence was tested during transplant procedures into the omentum of dogs. Four dogs were transplanted with microparticles containing canine islets. On the day of the transplant, the animals were anesthetized using standard veterinary procedures including a cephalic vein catheter for infusion of fluids before, during and after the surgical procedure. The surgeon injected the microparticles into the omental veil. Care was taken not to enter or damage any intestinal tissues, blood vessels, nodes, or lymphatics. A total of 10,000 islet equivalents were contained in 1 mL of hydrogel microparticles. The manufacturing of the islet-containing PEGDA microparticles is described previously. Photographs were obtained before the omentum was gently returned to the abdomen and the abdominal wall was closed followed by intradermal sutures to close the skin.

Another example of tissue adhesion was demonstrated by injecting micro-beads into rat knees. Briefly, 100 uL of 300-micron PEGDA microparticles in PBS were extruded through a 25 G needle into the articular capsule of a Sprague-Dawley rat knee joint. Prior to extrusion, the solution and beads were stained blue in order to confirm the presence of microparticles inside the joint capsule.

Histology of Adhered Tissue

Healthy Sprague-Dawley rats were used to evaluate acute biocompatibility and location of the microparticles within the abdominal cavity (N=2 per microparticle formulation). Empty microparticles were implanted around the omentum following previously described procedure. Microparticles were delivered via syringe as a suspension in DPBS. Approximately 1 mL of loosely packed microparticles were deposited around and within omentum of the rat. Rats were monitored and scored daily for pain markers and activity levels for 10 days following implantation of the microparticles.

Rats were sacrificed 14 days after implantation for evaluation of the implantation site for determination of the microparticle location within the abdominal cavity and examination for possible tissue abnormalities. Tissue samples were collected and preserved in neutral buffered formalin, embedded in paraffin and sectioned at 7-micron thicknesses. Sections were stained with H&E and evaluated microscopically.

Results

Figure 19:
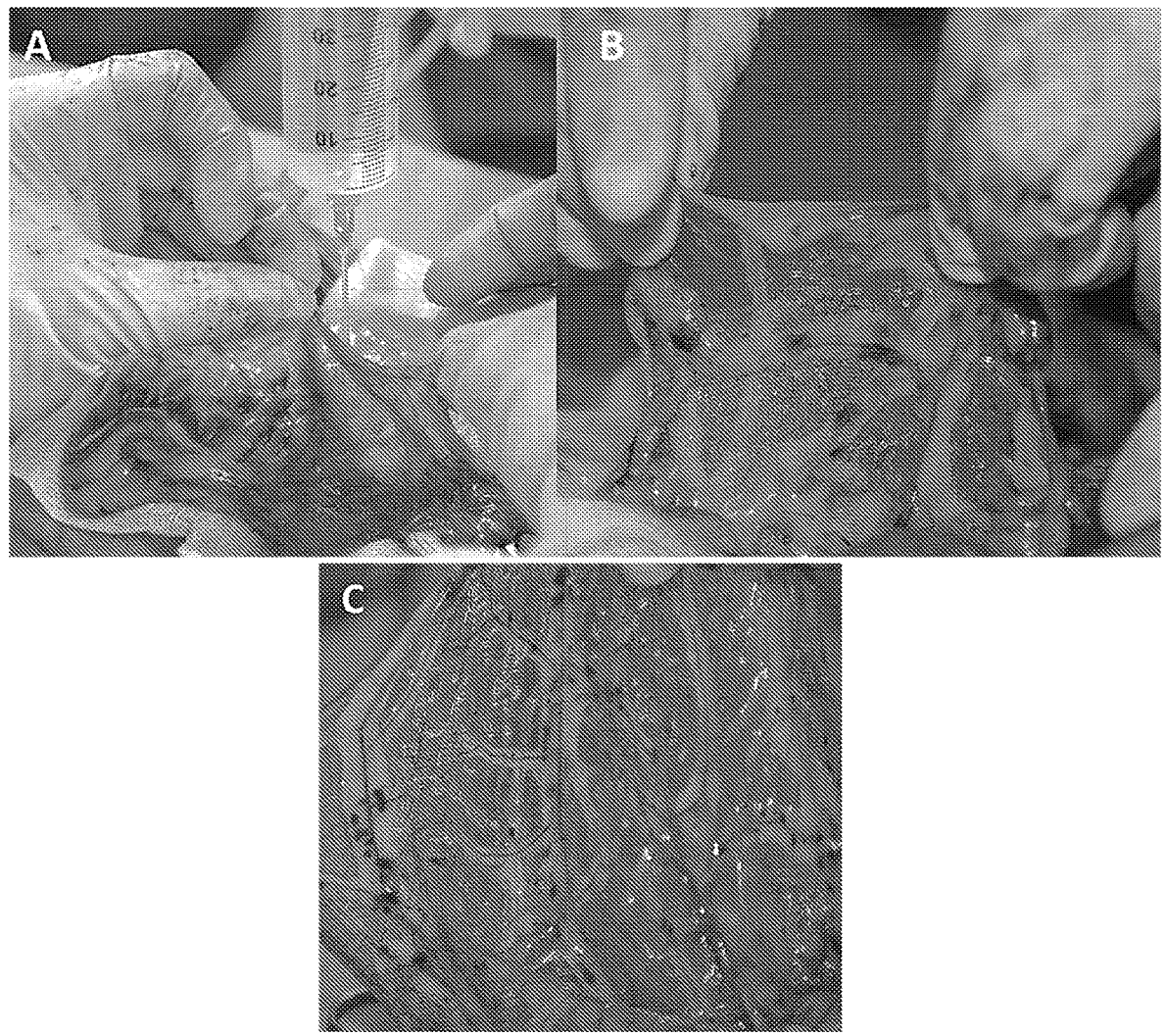
FIG. 19 shows images of (A) PEDGA microparticles infused within and around the abdominal omentum, (B) microparticles clinging to tissue in a first dog, and (C) and microparticles clinging to tissue in a second dog demonstrating the "stickiness" of the particles.

PEDGA microparticles were infused within and around the abdominal omentum as shown in FIG. 19A and described by the methods section. Immediately after the microparticles in media were infused within and around the omentum, images were collected showing the microparticles clinging to the tissue, even when the omentum was manually manipulated. FIGS. 19B and 19C illustrate the results from two different dogs, both showing the sticky nature of the microparticles.

Figure 20:
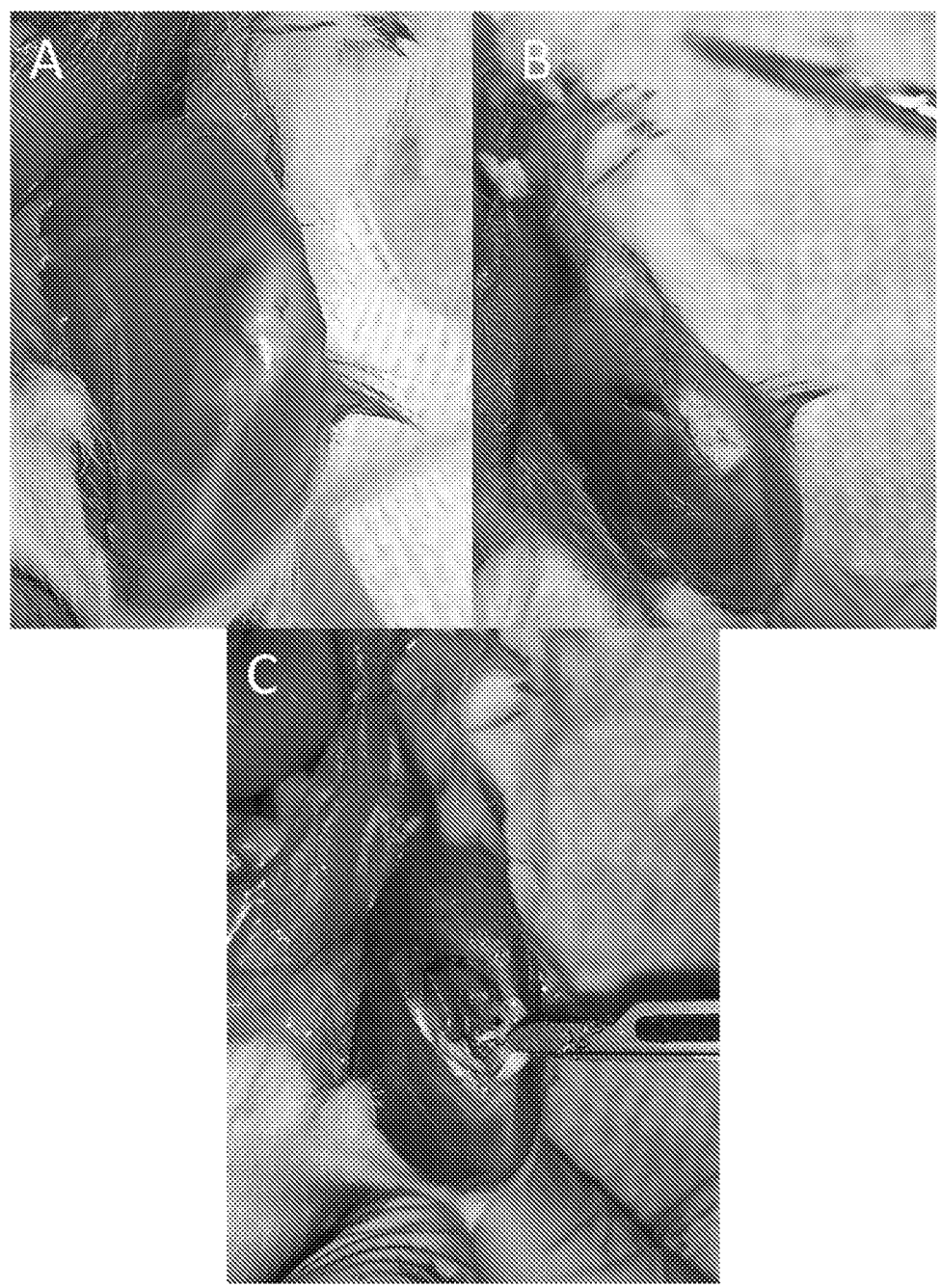
FIG. 20 shows images of (A) blue-stained PEGDA microparticles in the knee joint of a rat, visible through the muscle; (B) dissected knee joint showing blue-stained PEGDA microparticles in the knee capsule area; and (C) further dissected knee joint showing blue-stained PEGDA microparticles remained where initially implanted in the knee joint.

Stained PEGDA microparticles were injected into the knees of rats. Following manual manipulation of the joints, the joints were dissected. Even through the muscle, the blue from the microparticles was visible (FIG. 20A). With further dissection, the microparticles were visible and found to be still within the knee joint (FIGS. 20B and C).

The durable PEGDA and degradable MeHA and AHA microparticles (without cells) were implanted into healthy Sprague-Dawley rats to evaluate safety and biocompatibility of the microparticles produced using the CSS method along with location and attachment to surrounding tissue. Necropsies were done after 2 and 10 weeks and no signs of acute inflammation, excess fluid, or tissue abnormalities were observed throughout the abdominal cavity, though some tissue adhesions were identified where the omentum was sutured to the stomach wall. Both formulations of microparticles were found intact in the omentum, and were visually translucent, and appeared to be surrounded by a very thin film-like layer. A small number of microparticles were found adhered to the surface of the liver. However, the large majority of microparticles were attached to the omentum, with a few free-floating microparticles.

Figure 21:
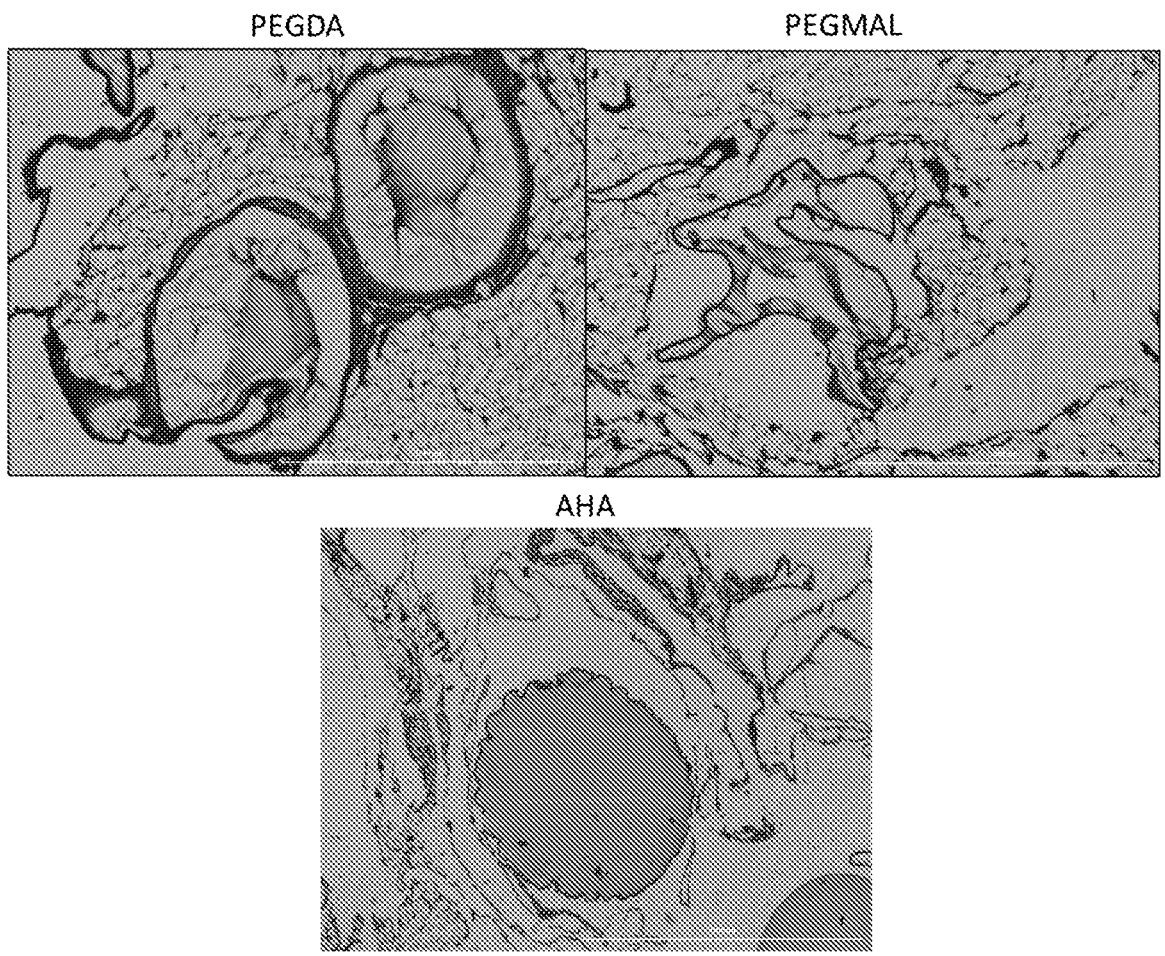
FIG. 21 shows images of hematoxylin and eosin staining of the explanted tissues for three microparticle groups.

Hematoxylin and eosin staining of the explanted tissues is shown in FIG. 21 for the three microparticle groups. No remarkable differences were noted between the groups. The microparticles were generally intact but appeared to have contracted in size and in some cases crushed/deformed as a result of tissue processing for histology. Microparticles were commonly found to have a thin layer of cells around their perimeters, often two or three cells thick, and all were devoid of cells in the interior, given that empty microparticles were injected into the animals. Most single microparticles were surrounded by normal omental tissue, illustrating the lack of an inflammatory response in response to the microparticles of various formulations.

Figure 22:
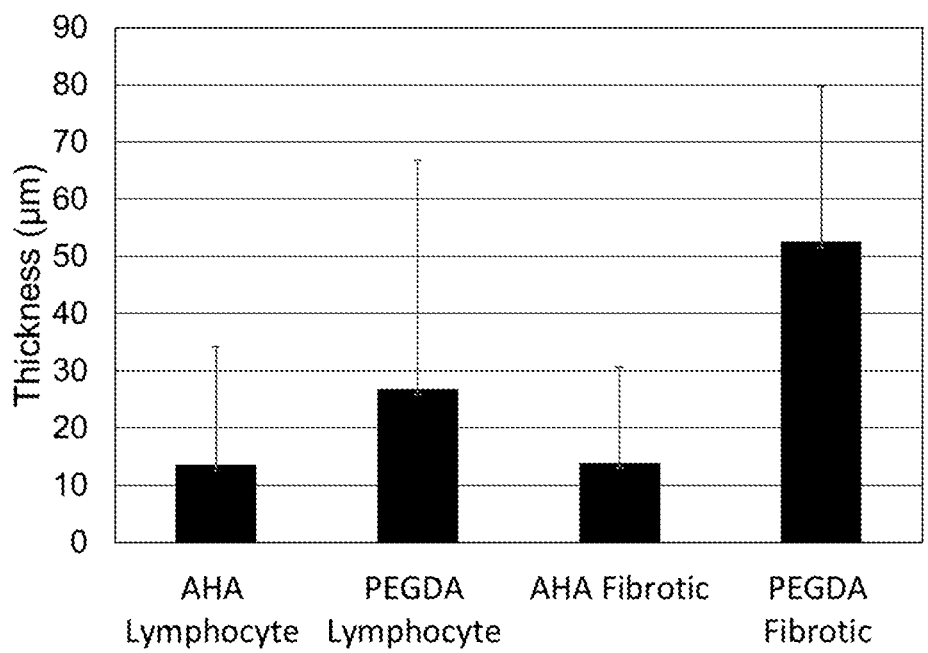
FIG. 22 is a graph of the (lack of) foreign body response to the microparticles in the omentum.

Quantification of the foreign body response to the microparticles in the omentum is illustrated in FIG. 22. The width of the fibrotic region, identified by low cellularity and higher collagen content was minimal in the AHA and higher around the PEGDA microparticles. Still, the thickness of the fibrotic ring around the PEGDA microparticles is still less than reported for other hydrogel formulations, such as alginate. Likewise, the lymphocytic region was less in AHA microparticles. The lymphocytic regions were defined as the cellular immune cells that migrated around the microparticles. They, too, were higher for the PEGDA microparticles, but still considered minimal (FIG. 22).

Discussion

A unique and advantageous characteristic of the final product is that it is sticky whether composed of a durable or degradable hydrogel matrix. This sticky characteristic allows it to quickly attach to the surrounding tissue and be retained in that area until degraded. In addition to islets being attached to the surrounding tissues in the peritoneal space, the use of the sticky hydrogel for administration of MSC or other cells that release anti-inflammatory or pro-healing cytokines, could be injected into joints or other inflamed tissue for a prolonged delivery of cellular factors to a localized region without concern for redistribution to other areas of the body.

Example 7

Investigation of Parameters Affecting Hydrogel Properties

In this Example, various parameters were investigated to better understand their relationship to each other and the impact on the properties and characteristics of the resulting hydrogel microparticles. As discussed in more detail below, the various microparticle characteristics can be finely tuned and adjusted to the particular desired treatment protocol and outcome. Notably, each of these parameters is a dynamic factor in hydrogel microparticle fabrication, meaning its impact will be relative to the amounts or ratios of other components used in the formulation and/or the other processing parameters. Further, modification of certain parameters does not necessarily yield a proportional change in the resulting hydrogel. Again, however, the nuance in the different microparticle formulations and processing parameters permits many different customizable characteristics depending upon the cell type to be encapsulated, the location for implantation, and the condition to be treated or prevented, among other desired outcomes.

To explore these different parameters, the swelling ratio (Q) is used as a proxy for relative degradation rate of the microparticles.

A. Mass Fraction of Core Polymer Species

Figure 23:
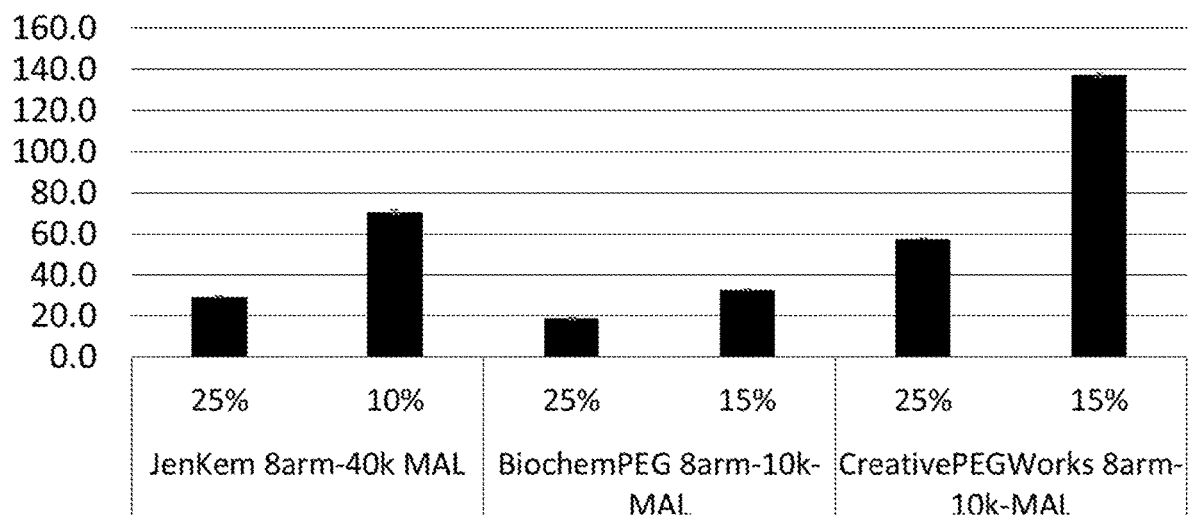
FIG. 23 is a graph of the effect of the mass fraction of the core (backbone) polymer species used in the hydrogel precursor solution on Q value.

Mass fraction refers to the % composition by mass of the reactive polymer species in the hydrogel precursor solution used for the polymer backbone (e.g., 2.5 g PEGMAL in 10 g precursor solution=25% mass fraction). Adjusting the mass fraction of reactive polymer in the precursor solution has a consistent impact on the resulting Q value. The lower the mass fraction, the higher the Q value, and the softer the gel. This is illustrated by crosslinking various multi-arm PEGMAL species with 500 Da PEG dithiol. The crosslinker concentration in this example was held constant at 0.25% mass fraction in the alginate bath. A non-reactive PEG species (PEG 8000) was included in the lower mass fraction groups to maintain a constant solution viscosity. The results are shown in FIG. 23.

B. Concentration of Crosslinking Species in Alginate Bath

Concentration of crosslinker (e.g. PEG dithiol, DTT) in the alginate bath will affect the resulting hydrogel microparticles. However, the relationship of crosslinker to the hydrogel matrix is not straightforward, as one can have either too little or too much crosslinker in the bath. Insufficient crosslinker yields weak gels that are insufficiently crosslinked; however, too much crosslinker will also saturate reactive sites on the polymer backbone, likewise preventing crosslinks and yielding weak gels. Therefore, this parameter must also be balanced with the amount and type of polymer precursors used for the backbone.

1. Increasing Crosslinker Concentration Resulting in Lower Q Values.

Figure 24A:
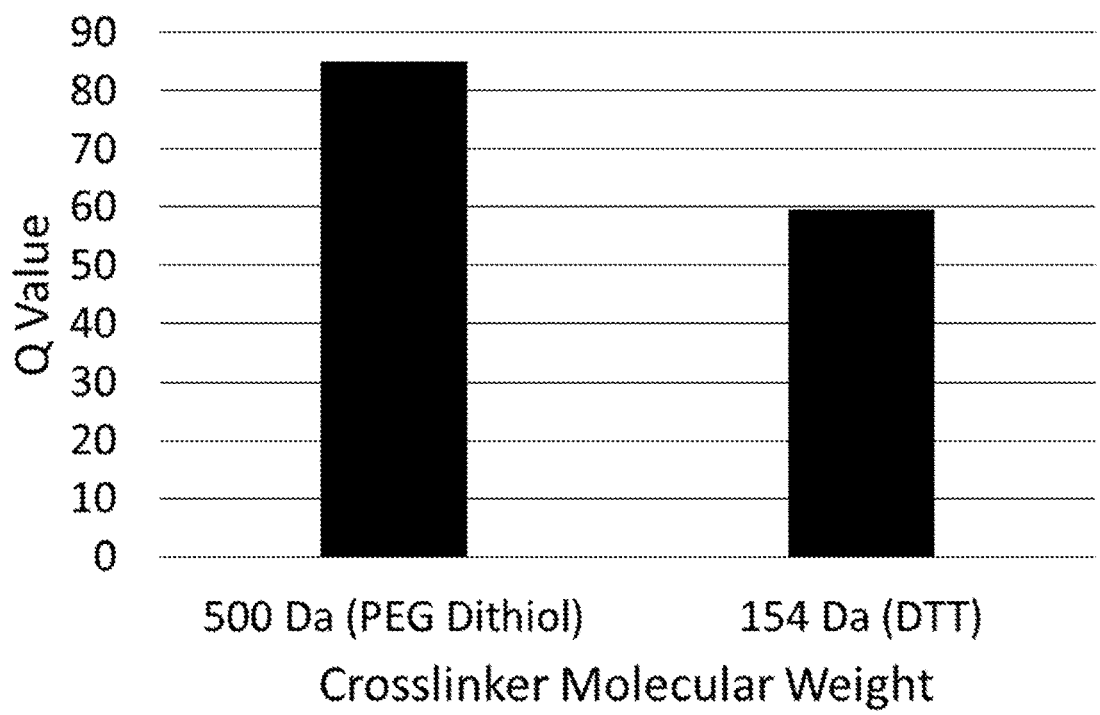
FIG. 24A is a graph demonstrating a formulation where increasing crosslinker concentration resulted in lower Q values.

In this example (core polymer=4-arm 10 kDa PEGMAL) increasing crosslinker concentration (DTT) produced lower Q values. This indicates that the crosslinker concentration never reached levels at which core polymer saturation occurred. The results are shown in FIG. 24A.

2. Increasing Crosslinker Concentration Resulting in Higher Q Values.

Figure 24B:
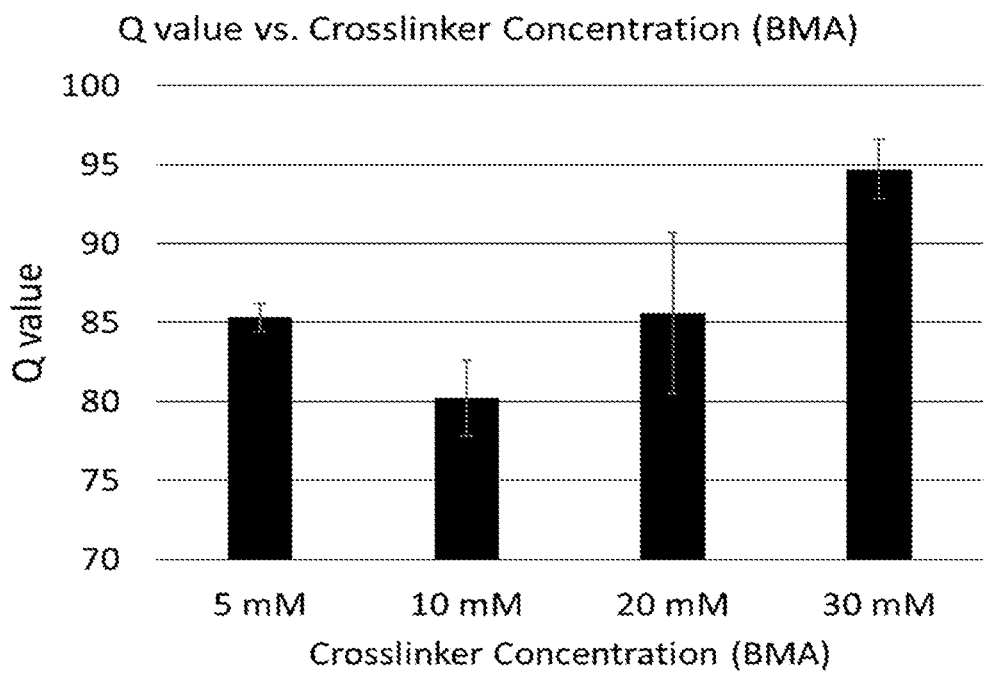
FIG. 24B is a graph demonstrating a formulation where increasing crosslinker concentration resulted in higher Q values.

In this example (core polymer=8-arm 40 kDa PEG-vinylsulfone), increasing crosslinker (BMA, CAS 123-81-9) concentration initially resulted in lower Q values but further increases led to higher Q values, in contrast to what was observed in example 1. Notably, the relative molarity of crosslinker (thiol) to core reactive group (vinylsulfone) was different from the previous example. Thus, the conditions in example 2 likely led to saturation of the core polymer molecules and thus inefficient crosslinking, resulting in a weaker gel network and higher Q. The results are shown in FIG. 24B.

C. Alginate Bath pH

Thiol-ene reactions are strongly influenced by the environmental pH. Higher pH levels dramatically increase thiol-ene reaction kinetics. Thus, modulating the pH of the alginate bath can greatly influence the dynamics of gel crosslinking and resulting Q values.

1. Increasing pH Leading to Higher Q Values.

Figure 25A:
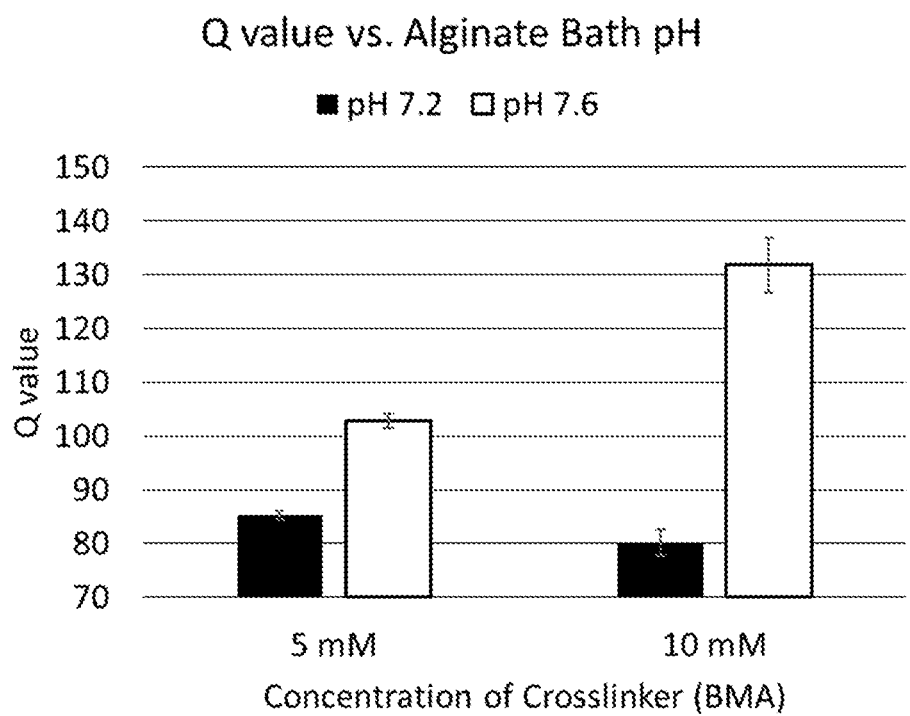
FIG. 25A is a graph demonstrating a formulation where increasing pH lead to higher Q values.

In this example (core polymer=8-arm 40 kDa PEG-vinylsulfone; crosslinker=BMA), increasing the bath pH resulted in higher Q values. The results are shown in FIG. 25A. The increased reaction rate may have led to faster reaction with and ultimately partial saturation of the core polymer, thus a weaker gel network and higher Q value.

2. Increasing pH Leading to Lower Q Values.

Figure 25B:
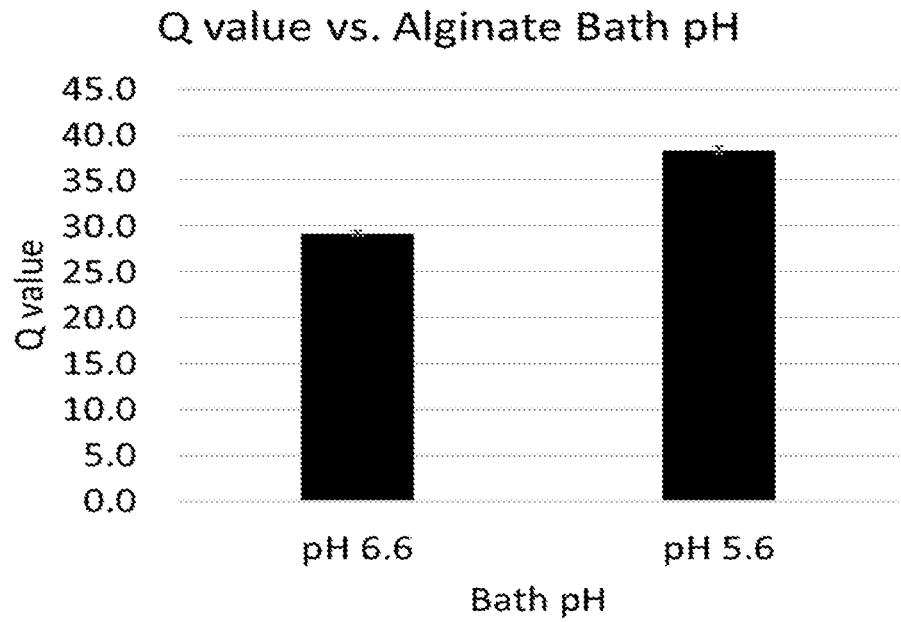
FIG. 25B is a graph demonstrating a formulation where increasing pH lead to lower Q values.

In this example (core polymer=8-arm 40 kDa PEGMAL; crosslinker=500 Da PEG dithiol), increasing the pH resulted in a lower Q value. The polymer and crosslinker are balanced to avoid saturation. Thus, the increased pH in this case resulted in faster reaction kinetics and more effective crosslinking. The results are shown in FIG. 25B. Note that the increase in Q value relative to the increase in pH is fairly minor in example 2 compared to the very sharp increases in example 1. Thus, both the direction and magnitude of effects of pH on Q values appears to be highly influenced by the relative amount of crosslinker and core polymer reactive sites.

D. Molecular Weight of Crosslinking Species

Molecular weight of the crosslinking species affects both the rate of diffusion into the core-shell construct as well as the distance between crosslinks in the gel network. Thus, differences in the MW of the crosslinking species can impact the final Q value of the resulting gel microparticles, depending upon the other parameters used in the process.

1. Increasing MW Resulting in Higher Q Value.

Figure 26A:
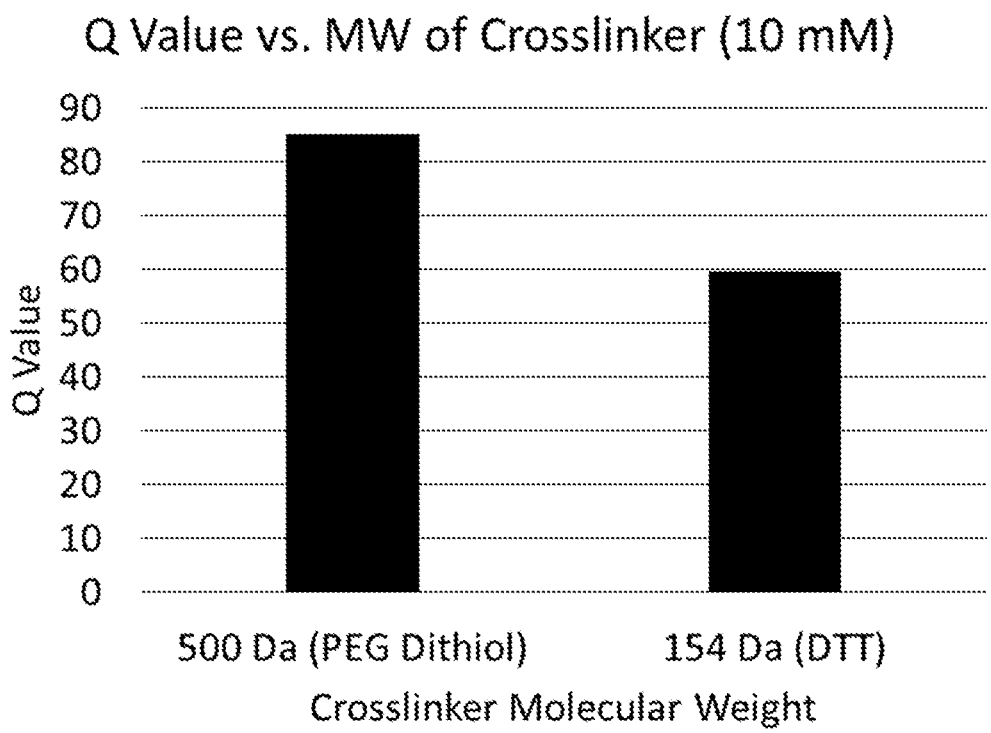
FIG. 26A is a graph demonstrating a formulation where increasing molecular weight of the crosslinker lead to higher Q values.

In this example, (core polymer=8-arm 40 kDa PEG-vinylsulfone), increasing MW of the crosslinking species from 154 Da to 500 Da results in a noticeable increase in Q value. The molarity of the crosslinker species was 10 mM for both preparations. The results are shown in FIG. 26A.

2. Increasing MW Resulting in No Change in Q Value.

Figure 26B:
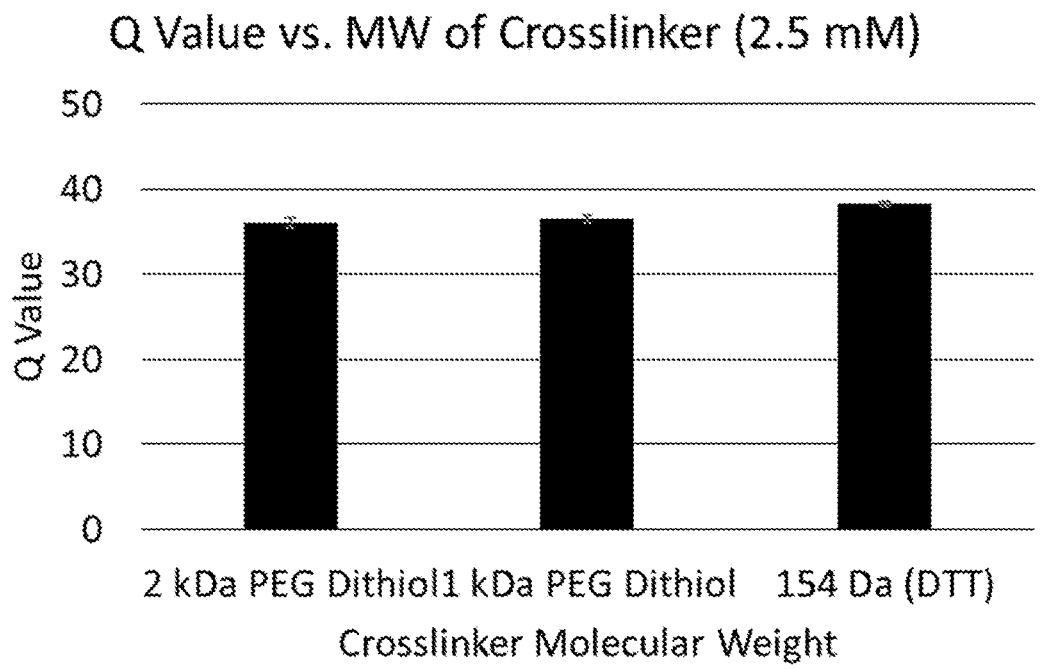
FIG. 26B is a graph demonstrating a formulation where increasing molecular weight of the crosslinker caused no change in Q values.

In this example, (core polymer=8-arm 40 kDa PEG-MAL), increased MW of crosslinker resulted in no apparent difference in Q value of the resulting gels. The impact of crosslinker MW changes may be offset of adjusting the relative amount of crosslinker used in comparison to polymer reactive sites. The results are shown in FIG. 26B.

E. Molecular Weight of Core Polymer Species

The molecular weight of the core polymer species appears to impact Q value much more predictably than the molecular weight of the crosslinker, assuming the reactive sites per gram of the polymer are preserved. For example, an 8-arm 40 kDa PEGMAL and a 4-arm 20 kDa PEGMAL have the same number of reactive sites (maleimides) per gram. However, as shown below, the 40 kDa species produces much stronger gels (lower Q values) when prepared under otherwise identical circumstances.

1. Effect of MW of Core Polymer at Constant Reactive Sites/Gram.

Figure 27A:
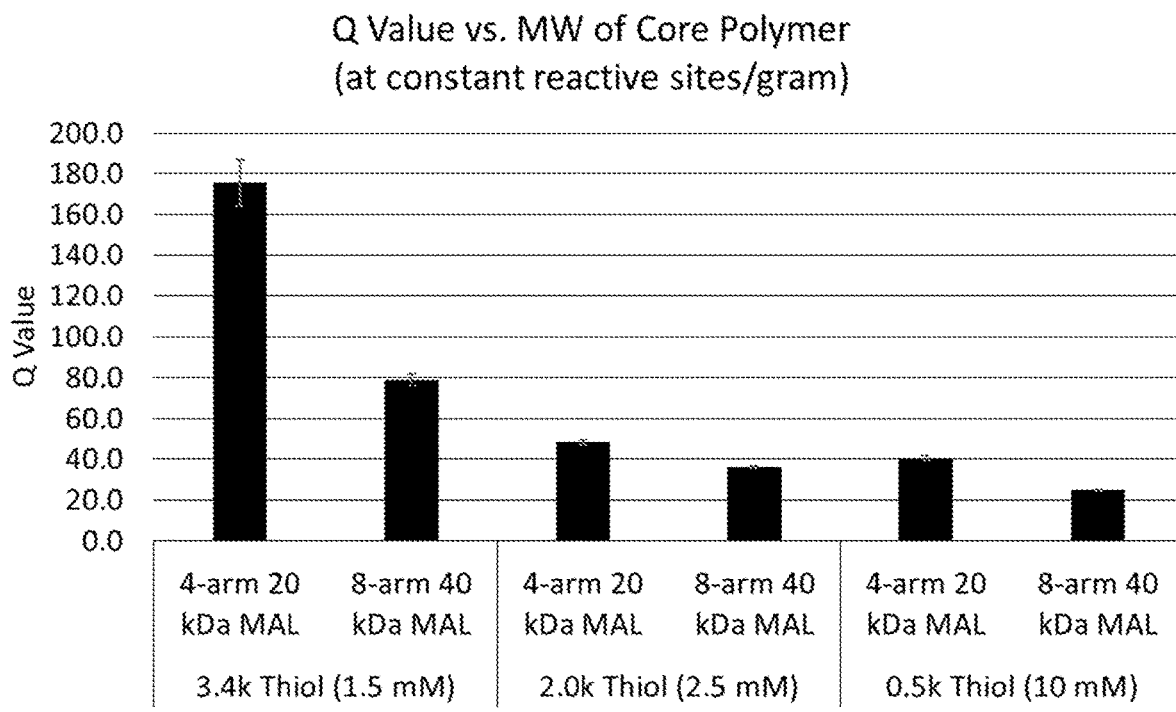
FIG. 27A is a graph of the effect on Q value of changing the molecular weight of the core polymer species with constant reactive sites/gram.

This example demonstrates the impact of core polymer molecular weight on the Q value of gel microparticles prepared by CSS using three side by side comparisons. In all preparations, Q values decreased when core MW was increased, despite being of identical mass fractions and reactive sites/gram. Note that the effect of core MW is more pronounced as the concentration of crosslinker is reduced (and size increased). The results are shown in FIG. 27A.

2. Effect of MW of Core Polymer at Unequal Reactive Sites/Gram.

Figure 27B:
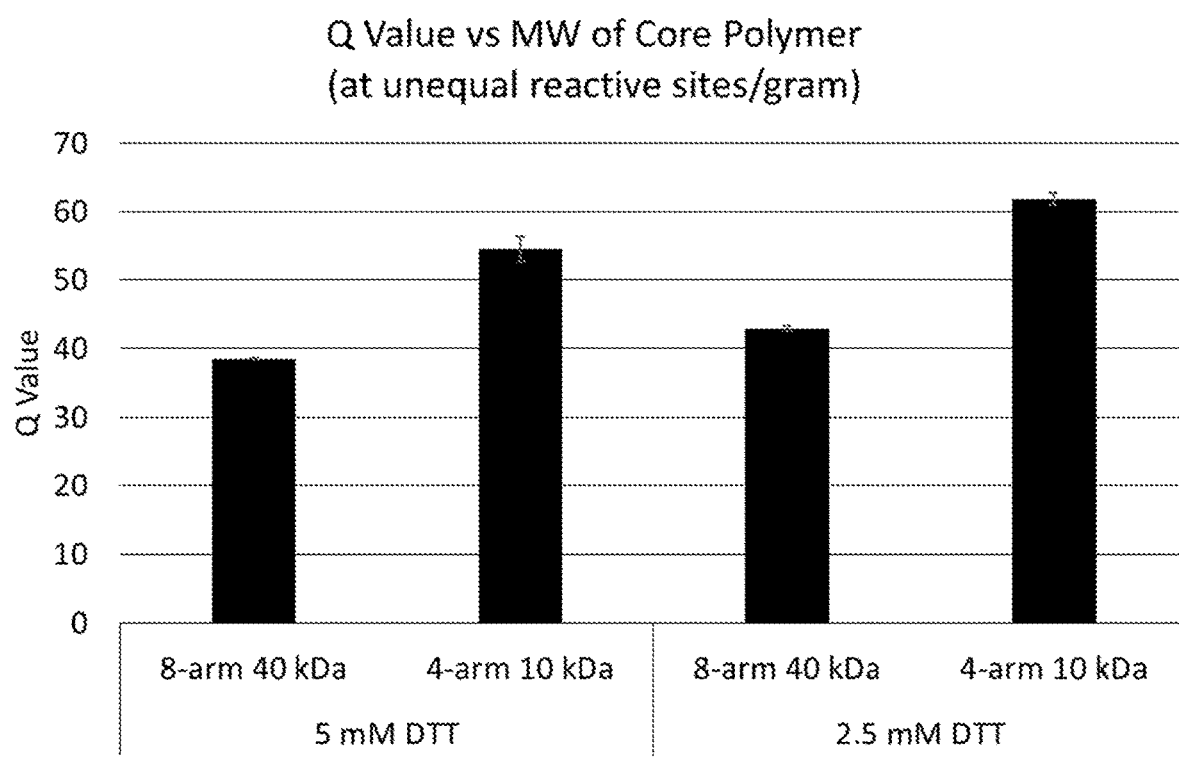
FIG. 27B is a graph of the effect on Q value of changing the molecular weight of the core polymer species with different reactive sites/gram.

In this example, microparticles made from either 8-arm 40 kDa or 4-arm 10 kDa PEGMAL core species are compared. Core polymer solutions were 10% mass fraction in all cases. The 4-arm 10 kDa species has 2× the reactive site/gram compared to the 8-arm 40 kDa, yet despite the lower potential crosslink density, the 8-arm 40 kDa microparticles had lower Q values (i.e. stronger gels) compared to the 4-arm 10 kDa microparticles. The results are shown in FIG. 27B.

F. Effect of UV Crosslinking Time

Figure 28A:
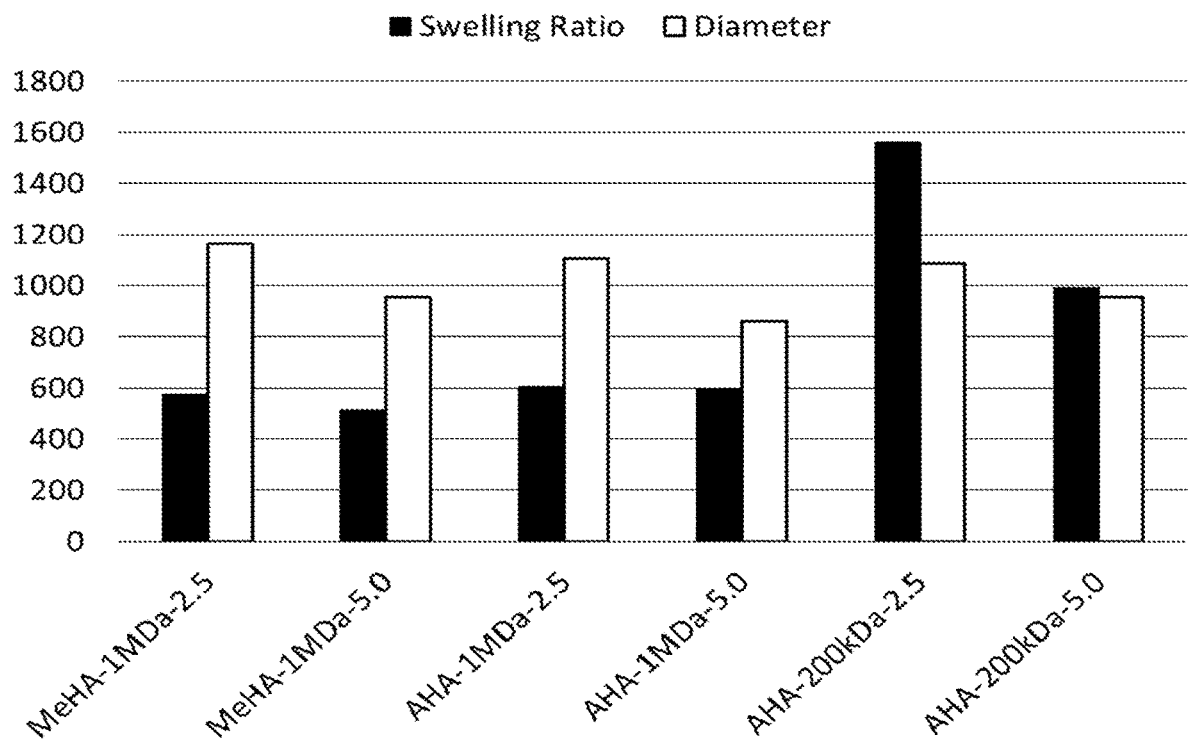
FIG. 28A is a graph of the effect of UV crosslinking time on different microparticle formulations on Q value (swelling ratio) and diameter of the particles.
Figure 28B:
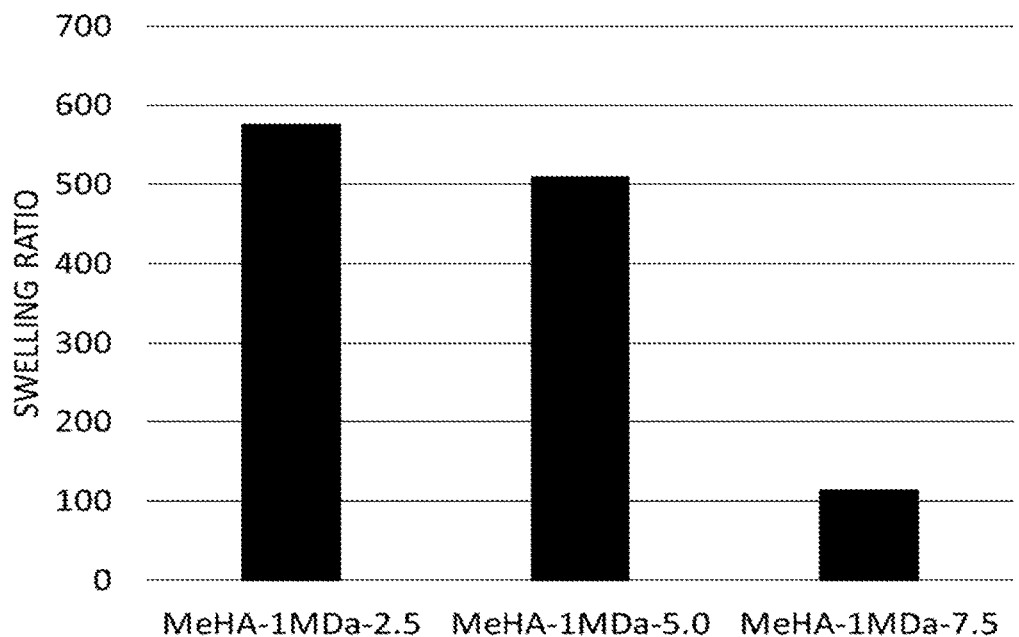
FIG. 28B is a graph of the effect of UV crosslinking time on MeHA microparticles Q value.

In this example, different molecular weight AHA and MeHA microspheres were produced at various UV exposure times. Briefly, 2.5% 1 MDa or 200 kDa AHA or 1 MDa MeHA solutions (each with 1% 3.4 kDa PEGDA) were extruded dropwise into a stirred alginate bath as described above and exposed to UV light for 2.5, 5, or 7.5 minutes. The resulting diameters and hydrogel swelling ratios were quantified for each polymer type. The results are shown in FIG. 28A and FIG. 28B, where the microsphere diameters and swelling ratios change as a function of UV exposure time. These results illustrate that as UV exposure time is increased, both diameter and swelling ratio decrease. Notably, 1 MDa MeHA hydrogel microsphere swelling ratios decreased dramatically after being exposed to UV light for 7.5 minutes compared to 5 minutes, where the swelling ratios are 509.1 and 113.4, respectively. This trend is constant for each polymer type and molecular weight and demonstrate control in hydrogel durability through variation in UV exposure time.

G. Potential Control of Hydrogel Degradation by Hydrolytic Stability of Crosslinking Species Regardless of Q Value.

1. BMA as a More Hydrolytically Labile Crosslinker.

Certain crosslinkers can be used to impact the degradation profile for the microparticles. For example, the dithiolate crosslinker molecule, BMA, could potentially be leveraged as a way to expedite hydrolytic degradation of thiol-ene type hydrogels.

A series of hydrogel microparticles composed of PEG-vinyl sulfone crosslinked by either DTT or BMA were prepared and stored in 50 mL polypropylene tubes, for at least 6 months in DPBS at room temperature (~27° C.). Table 3, below, lists the compositions of each preparation and corresponding swelling ratios for reference. After 6 months in storage, the microparticles were qualitatively re-examined for signs of degradation. Notably, all microparticles crosslinked by BMA were completely degraded by 6 months. Those crosslinked by DTT appeared relatively unchanged after 6 months, though formal characterization has not been done at this time. Furthermore, two of the completely degraded BMA crosslinked microparticles had previously exhibited the lowest Q values of all microparticles included in this table, yet were still completely degraded compared to the DTT crosslinked microparticles, which were of higher Q values. This result suggests that BMA crosslinker could be a useful tool for creating microparticles that are initially very strong (low Q), but degrade much more quickly than other microparticles of similar initial strength crosslinked by DTT or PEG dithiol.

TABLE 3

Long-term durability of microparticles crosslinked with DTT or BMA.

| Crosslinker | Core Polymer Structure | Precursor Mass % | Initial Q Value | Status |
|---|---|---|---|---|
| DTT | 8-arm 40 kDa | 25% | 59.6 | Generally |
|  | 8-arm 20 kDa |  | 113.2 | Unchanged after 6 |
|  |  |  | 44.3 | months |
| BMA | 8-arm 40 kDa | 25% | 35.2 | Fully Degraded |
|  |  |  | 34.5 | within 6 months |
|  |  | 10% | 80.2 |  |
|  |  |  | 85.3 |  |
|  |  |  | 85.6 |  |
|  |  |  | 94.7 |  |
|  |  |  | 102.8 |  |
|  |  |  | 131.8 |  |
|  |  |  | 91.4 |  |
|  |  |  | 97.2 |  |
|  | 8-arm 20 kDa |  | 78.1 |  |

Table 4, below, provides a list of additional dithiol species and the corresponding pKa of the thiol group(s). The hydrolytic lability of a bond resulting from a thiol-ene reaction is correlated to the pKa of the reactive thiol. Thus, these species could be utilized as chemical crosslinkers in thiol-ene reaction schemes to control hydrolytic lability and therefore degradation rates of the microparticles.

TABLE 4

Examples of dithiol crosslinker species with varying degrees of hydrolytic lability.

| Chemical Name | pKa |
|---|---|
| Glyceryl dithioglycolate | 7.9-8.1 |
| Glycol dimercaptoacetate | 7.9-8.1 |
| PEG-diester-dithiol-1 | 7.9-8.1 |
| (S)-2 Aminobutane 1,4 dithiol | 8.5 |
| Dithiothreitol | 9.2 |
| Glycol di(3mercaptopropionate) | 9.4-9.5 |
| 2,2'-thiodiethanethiol | 9.4-9.5 |
| PEG-diester-dithiol-2 | 9.4-9.5 |
| 2-mercaptoethyl ether | 10.5-10.7 |
| 2,2'-(ethylenedioxy)diethandiol | 10.5-10.7 |
| Tetraethylene glycol dithiol | 10.5-10.7 |
| Hexaethhylene glycol dithiol | 10.5-10.7 |
| PEG-dithiol | 10.5-10.7 |

The invention claimed is:

1. A method for localized delivery and sustained release of therapeutic cells and/or tissues at a site of implantation, said method comprising administering a plurality of spherical or ellipsoidal microparticles to a site of implantation in a subject, wherein each microparticle in said plurality of microparticles is a non-alginate hydrogel microparticle comprising a 3-dimensional matrix of covalently crosslinked non-alginate polymer compounds and a therapeutically-effective amount of cells and/or tissue entrapped therein, wherein said cells have a viability of at least about 50%, and wherein each of said microparticles has a size of greater than about 30 µm, and wherein each of said microparticles is formed without oil-emulsion, and wherein said non-alginate polymer compounds are polyethylene glycol maleimide, polyethylene glycol vinyl sulfone, or acrylated hyaluronic acid, said matrix further comprises crosslinking agents crosslinked with said non-alginate polymer compounds selected from the group consisting of dithiothreitol, polyethylene glycol dithiol, ethylene glycol bis-mercaptoacetate, and combinations thereof.

2. The method of claim 1, wherein said microparticles biodegrade within about 3 months after said administration.

3. The method of claim 1, wherein said microparticles do not biodegrade for at least 6 months after said administration.

4. The method of claim 1, wherein said hydrogel microparticles adhere to tissue at the site of implantation thereby maintaining the implanted cells at the site of implantation for a therapeutic amount of time.

5. The method of claim 1, wherein said 3-dimensional matrix consists essentially of covalently crosslinked polyethylene glycol maleimide and polyethylene glycol dithiol precursor compounds.

6. The method of claim 1, wherein said 3-dimensional matrix consists essentially of covalently crosslinked polyethylene glycol vinyl sulfone and dithiothreitol or ethylene glycol bis-mercaptoacetate precursor compounds.

7. The method of claim 1, wherein up to 50% of the volume of said microparticle comprises said cells or tissue.

8. The method of claim 1, wherein said microparticle has storage stability in PBS at 37° C. of less than 6 months.

9. The method of claim 1, wherein said microparticle has storage stability in PBS at 37° C. of greater than 6 months.

10. The method of claim 1, wherein said microparticle is a degradable microparticle that will break down in less than 3 months when implanted in vivo.

11. The method of claim 1, wherein said microparticle is a durable microparticle that will not break down for at least 3 months when implanted in vivo.

12. The method of claim 1, further comprising cell media components.

13. The method of claim 1, wherein said cells are non-proliferative or proliferative.

14. The method of claim 1, further comprising cellular products secreted along with the cells include signaling molecules, cytokines, chemokines, therapeutic proteins, hormones, vesicles, antibodies, viruses, exosomes, and the like.

15. The method of claim 1, wherein said cells are engineered or transgenic cells.

16. The method of claim 1, wherein said cells are clusters of a plurality of aggregated cells.

17. The method of claim 16, wherein said clusters comprise two or more different types of cells.

18. The method of claim 1, wherein said microparticle has a size of from about 50 µm to about 5 mm.

19. The method of claim 1, said method comprising administering a composition comprising a plurality of said hydrogel microparticles dispersed or suspended in a biocompatible delivery vehicle to said site of implantation in said subject.

* * * * *